(12) United States Patent
Vannithamby et al.

(10) Patent No.: US 11,792,844 B2
(45) Date of Patent: Oct. 17, 2023

(54) RANDOM ACCESS CHANNEL SECURITY

(71) Applicant: Intel Corporation, Santa Clara, CA (US)

(72) Inventors: Rath Vannithamby, Portland, OR (US); Kathiravetpillai Sivanesan, Portland, OR (US); Liuyang Lily Yang, Portland, OR (US); Christian Maciocco, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 117 days.

(21) Appl. No.: 17/482,883

(22) Filed: Sep. 23, 2021

(65) Prior Publication Data
US 2022/0015140 A1     Jan. 13, 2022

(51) Int. Cl.
| | | |
|---|---|---|
| H04W 74/00 | (2009.01) | |
| H04W 12/08 | (2021.01) | |
| H04W 48/02 | (2009.01) | |
| H04W 74/08 | (2009.01) | |

(52) U.S. Cl.
CPC ......... *H04W 74/008* (2013.01); *H04W 12/08* (2013.01); *H04W 48/02* (2013.01); *H04W 74/0833* (2013.01)

(58) Field of Classification Search
CPC ... H04W 48/02; H04W 12/08; H04W 74/008; H04W 74/0833
USPC .......................................... 455/410, 411, 434
See application file for complete search history.

(56) References Cited

U.S. PATENT DOCUMENTS

| | | | |
|---|---|---|---|
| 10,588,153 B2 | 3/2020 | Wang et al. | |
| 2018/0352580 A1* | 12/2018 | Wang | .................... H04W 76/18 |
| 2021/0251016 A1 | 8/2021 | Xiong et al. | |

FOREIGN PATENT DOCUMENTS

| | | |
|---|---|---|
| CA | 2520418 | 10/2004 |
| CN | 101969662 | 4/2015 |
| WO | 2004088454 | 10/2004 |

OTHER PUBLICATIONS

"Netherlands Application Serial No. 2032756, Office Action dated Jul. 19, 2023", W English Translation, 9 pgs.

* cited by examiner

*Primary Examiner* — Joel Ajayi
(74) *Attorney, Agent, or Firm* — Schwegman Lundberg & Woessner, P.A.

(57) ABSTRACT

Various systems and methods for implementing random access channel security are described herein. An apparatus for a base station includes: receiver circuitry to receive at the base station, a signal from a user equipment (UE) transmitter to access resources of the base station; statistics circuitry to calculate high-order statistics on the signal to produce an identification indication; a memory device to store the high-order statistics and the identification indication; and processing circuitry to: associate the identification indication with the UE transmitter; use the identification indication to determine that multiple failures of a random access channel (RACH) process have occurred from the UE transmitter; and restrict later attempts by the UE transmitter to perform RACH processes with the base station.

25 Claims, 12 Drawing Sheets

RANDOM ACCESS CHANNEL SECURITY

TECHNICAL FIELD

Embodiments described herein generally relate to fifth generation (5G) wireless communications and in particular, random access channel (RACH) security in 5G systems.

BACKGROUND

The use and complexity of wireless systems, which include 4th generation (4G) and 5th generation (5G) networks among others, has increased due to both an increase in the types of user equipment (UEs) devices using network resources as well as the amount of data and bandwidth being used by various applications, such as video streaming, operating on these UEs. With the vast increase in number and diversity of communication devices, the corresponding network environment, including routers, switches, bridges, gateways, firewalls, and load balancers, has become increasingly complicated, especially with the advent of next generation (NG) or new radio (NR) systems. As expected, a number of issues abound with the advent of any new technology.

The development of networks and wireless systems provides the infrastructure for edge computing. Edge computing, at a general level, refers to the transition of compute and storage resources closer to endpoint devices (e.g., consumer computing devices, user equipment, etc.) in order to optimize total cost of ownership, reduce application latency, improve service capabilities, and improve compliance with security or data privacy requirements. Edge computing may, in some scenarios, provide a cloud-like distributed service that offers orchestration and management for applications among many types of storage and compute resources. As a result, some implementations of edge computing have been referred to as the "edge cloud" or the "fog", as powerful computing resources previously available only in large remote data centers are moved closer to endpoints and made available for use by consumers at the "edge" of the network.

Edge computing use cases in mobile network settings have been developed for integration with multi-access edge computing (MEC) approaches, also known as "mobile edge computing." MEC approaches are designed to allow application developers and content providers to access computing capabilities and an information technology (IT) service environment in dynamic mobile network settings at the edge of the network. Limited standards have been developed by the European Telecommunications Standards Institute (ETSI) industry specification group (ISG) in an attempt to define common interfaces for operation of MEC systems, platforms, hosts, services, and applications.

Edge computing, MEC, and related technologies attempt to provide reduced latency, increased responsiveness, and more available computing power than offered in traditional cloud network services and wide area network connections. However, the integration of mobility and dynamically launched services to some mobile use and device processing use cases has led to limitations and concerns with orchestration, functional coordination, and resource management, especially in complex mobility settings where many participants (devices, hosts, tenants, service providers, operators) are involved. In a similar manner, Internet of Things (IoT) networks and devices are designed to offer a distributed compute arrangement, from a variety of endpoints. IoT devices are physical or virtualized objects that may communicate on a network, and may include sensors, actuators, and other input/output components, which may be used to collect data or perform actions in a real world environment. For example, IoT devices may include low-powered endpoint devices that are embedded or attached to everyday things, such as buildings, vehicles, packages, etc., to provide an additional level of artificial sensory perception of those things. Recently, IoT devices have become more popular and thus applications using these devices have proliferated.

The deployment of various Edge, Fog, MEC, and IoT networks, devices, and services have introduced a number of advanced use cases and scenarios occurring at and towards the edge of the network. However, these advanced use cases have also introduced a number of corresponding technical challenges relating to security, processing and network resources, service availability and efficiency, among many other issues, especially as more types of computing systems and configurations are deployed. One such challenge is in relation to security and trust, and the operational states of software programs and data, as represented in memory (e.g., DRAM memory), cache memory (e.g., in a cache), or registers (e.g., CPU, or GPU).

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Systems and methods described herein provide access control and security for cellular networks. In various examples, the systems and methods described herein enable a base station (BS) to detect and prevent rogue devices from accessing base station resources needed for connection set up. In cellular networks, such as Long Term Evolution (LTE), or next generation (NG) or new radio (NR) systems such as 5G, a UE uses a mechanism to synchronize the uplink (UL) and downlink (DL). The UE has to perform a random access channel (RACH) procedure in order to establish uplink synchronization. During this procedure, the BS uses some resources. A rogue device that initiates the RACH but does not complete the sequence wastes control and shared channel resources and may prevent genuine devices from attaching to the network. By using this maliciously, one or more UEs may impact network performance and in some cases, effectively create a denial of service (DOS) attack.

The systems and methods described in the present document address this problem by obtaining metrics of signals used by the UE to connect to the BS and performing statistical analysis on these signals. The statistical analysis results in a signature for the UE, which the BS may use in later communication sessions to prevent the UE from even initiating the RACH process. These functions and others are described in more detail below.

Figure 1:
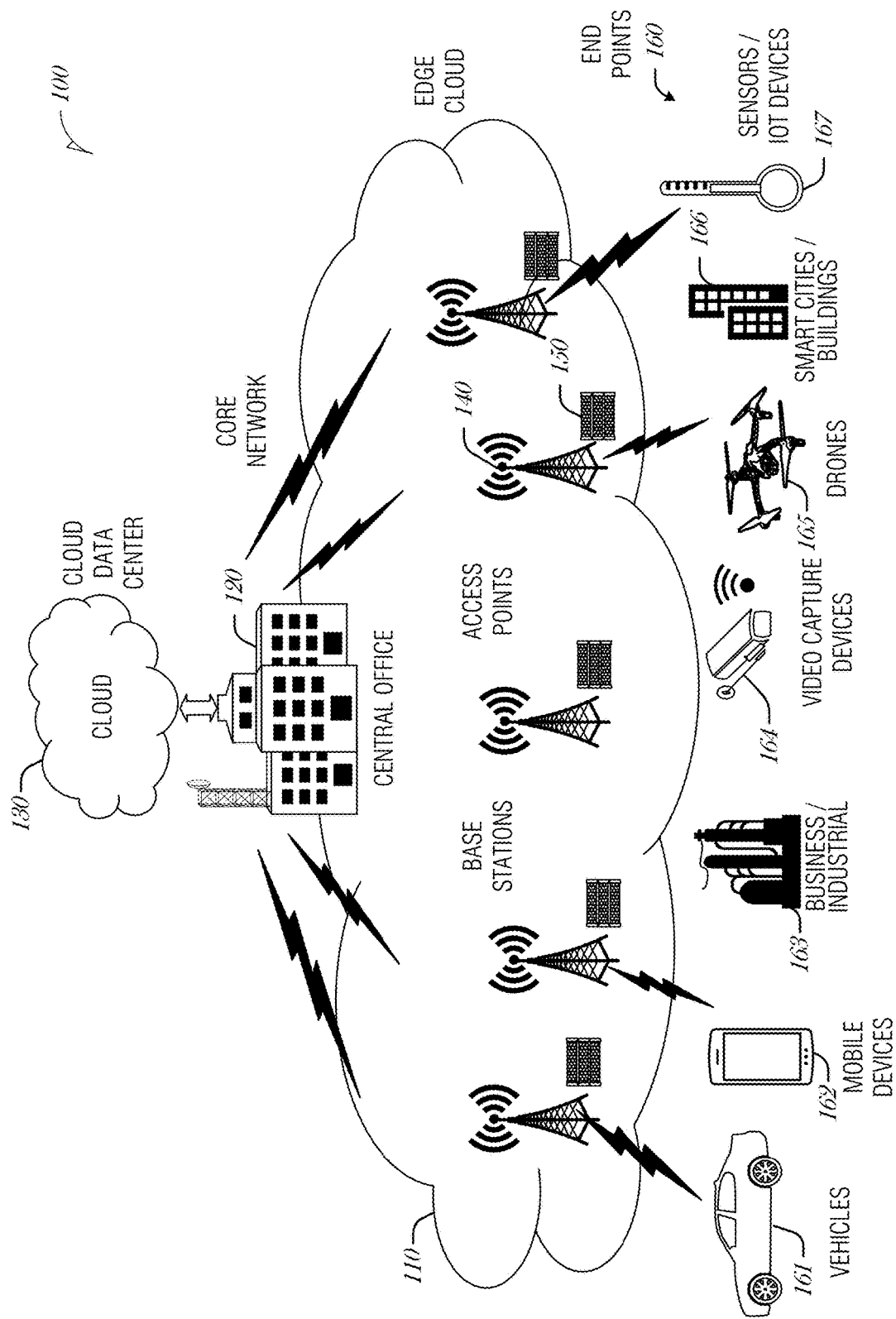
FIG. 1 illustrates an overview of an Edge cloud configuration for Edge computing.

FIG. 1 is a block diagram 100 showing an overview of a configuration for Edge computing, which includes a layer of processing referred to in many of the following examples as an "Edge cloud". As shown, the Edge cloud 110 is co-located at an Edge location, such as an access point or base station 140, a local processing hub 150, or a central office 120, and thus may include multiple entities, devices, and equipment instances. The Edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the Edge cloud 110 are critical to providing ultra-low latency response times for services and functions used by the endpoint data sources 160 as well as reduce network backhaul traffic from the Edge cloud 110 toward cloud data center 130 thus improving energy consumption and overall network usages among other benefits.

Compute, memory, and storage are scarce resources, and generally decrease depending on the Edge location (e.g., fewer processing resources being available at consumer endpoint devices, than at a base station, than at a central office). However, the closer that the Edge location is to the endpoint (e.g., user equipment (UE)), the more that space and power is often constrained. Thus, Edge computing attempts to reduce the amount of resources needed for network services, through the distribution of more resources which are located closer both geographically and in network access time. In this manner, Edge computing attempts to bring the compute resources to the workload data where appropriate, or, bring the workload data to the compute resources.

The following describes aspects of an Edge cloud architecture that covers multiple potential deployments and addresses restrictions that some network operators or service providers may have in their own infrastructures. These include, variation of configurations based on the Edge location (because edges at a base station level, for instance, may have more constrained performance and capabilities in a multi-tenant scenario); configurations based on the type of compute, memory, storage, fabric, acceleration, or like resources available to Edge locations, tiers of locations, or groups of locations; the service, security, and management and orchestration capabilities; and related objectives to achieve usability and performance of end services. These deployments may accomplish processing in network layers that may be considered as "near Edge", "close Edge", "local Edge", "middle Edge", or "far Edge" layers, depending on latency, distance, and timing characteristics.

Edge computing is a developing paradigm where computing is performed at or closer to the "Edge" of a network, typically through the use of a compute platform (e.g., x86 or ARM compute hardware architecture) implemented at base stations, gateways, network routers, or other devices which are much closer to endpoint devices producing and consuming the data. For example, Edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within Edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 2:
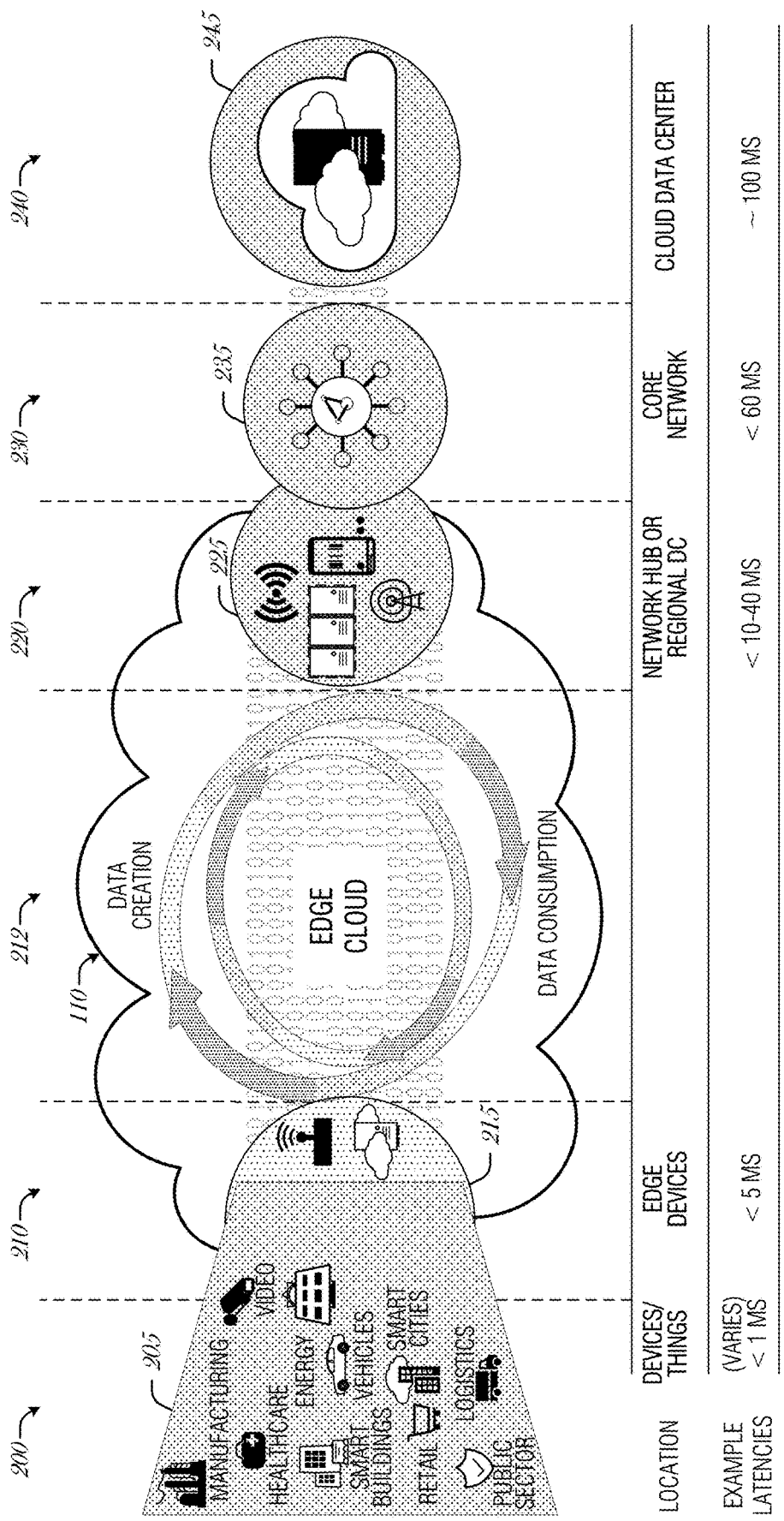
FIG. 2 illustrates operational layers among endpoints, an Edge cloud, and cloud computing environments.

FIG. 2 illustrates operational layers among endpoints, an Edge cloud, and cloud computing environments. Specifically, FIG. 2 depicts examples of computational use cases 205, utilizing the Edge cloud 110 among multiple illustrative layers of network computing. The layers begin at an endpoint (devices and things) layer 200, which accesses the Edge cloud 110 to conduct data creation, analysis, and data consumption activities. The Edge cloud 110 may span multiple network layers, such as an Edge devices layer 210 having gateways, on-premise servers, or network equipment (nodes 215) located in physically proximate Edge systems; a network access layer 220, encompassing base stations, radio processing units, network hubs, regional data centers (DC), or local network equipment (equipment 225); and any equipment, devices, or nodes located therebetween (in layer 212, not illustrated in detail). The network communications within the Edge cloud 110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 200, under 5 ms at the Edge devices layer 210, to even between 10 to 40 ms when communicating with nodes at the network access layer 220. Beyond the Edge cloud 110 are core network 230 and cloud data center 240 layers, each with increasing latency (e.g., between 50-60 ms at the core network layer 230, to 100 or more ms at the cloud data center layer). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies. In some examples, respective portions of the network may be categorized as "close Edge", "local Edge", "near Edge", "middle Edge", or "far Edge" layers, relative to a network source and destination. For instance, from the perspective of the core network data center 235 or a cloud data center 245, a central office or content data network may be considered as being located within a "near Edge" layer ("near" to the cloud, having high latency values when communicating with the devices and endpoints of the use cases 205), whereas an access point, base station, on-premise server, or network gateway may be considered as located within a "far Edge" layer ("far" from the cloud, having low latency values when communicating with the devices and endpoints of the use cases 205). It will be understood that other categorizations of a particular network layer as constituting a "close", "local", "near", "middle", or "far" Edge may be based on latency, distance, number of network hops, or other measurable characteristics, as measured from a source in any of the network layers 200-240.

The various use cases 205 may access resources under usage pressure from incoming streams, due to multiple services utilizing the Edge cloud. To achieve results with low latency, the services executed within the Edge cloud 110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, Edge computing within the Edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of Edge computing comes the following caveats. The devices located at the Edge are often resource constrained and therefore there is pressure on usage of Edge resources. Typically, this is addressed through the pooling of memory and storage resources for use by multiple users (tenants) and devices. The Edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because Edge locations may be unmanned and may even need permissioned access (e.g., when housed in a third-party location). Such issues are magnified in the Edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an Edge computing system may be described to encompass any number of deployments at the previously discussed layers operating in the Edge cloud 110 (network layers 200-240), which provide coordination from client and distributed computing devices. One or more Edge gateway nodes, one or more Edge aggregation nodes, and one or more core data centers may be distributed across layers of the network to provide an implementation of the Edge computing system by or on behalf of a telecommunication service provider ("telco", or "TSP"), internet-of-things service provider, cloud service provider (CSP), enterprise entity, or any other number of entities. Various implementations and configurations of the Edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the Edge computing system does not necessarily mean that such node or device operates in a client or agent/minion/follower role; rather, any of the nodes or devices in the Edge computing system refer to individual entities, nodes, or subsystems which include discrete or connected hardware or software configurations to facilitate or use the Edge cloud 110.

As such, the Edge cloud 110 is formed from network components and functional features operated by and within Edge gateway nodes, Edge aggregation nodes, or other Edge compute nodes among network layers 210-230. The Edge cloud 110 thus may be embodied as any type of network that provides Edge computing and/or storage resources which are proximately located to radio access network (RAN) capable endpoint devices (e.g., mobile computing devices, IoT devices, smart devices, etc.), which are discussed herein. In other words, the Edge cloud 110 may be envisioned as an "Edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the Edge cloud 110 may be servers, multi-tenant servers, appliance computing devices, and/or any other type of computing devices. For example, the Edge cloud 110 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, Edge devices are devices presented in the network for a specific purpose (e.g., a traffic light), but may have processing and/or other capacities that may be utilized for other purposes. Such Edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 4B. The Edge cloud 110 may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 3:
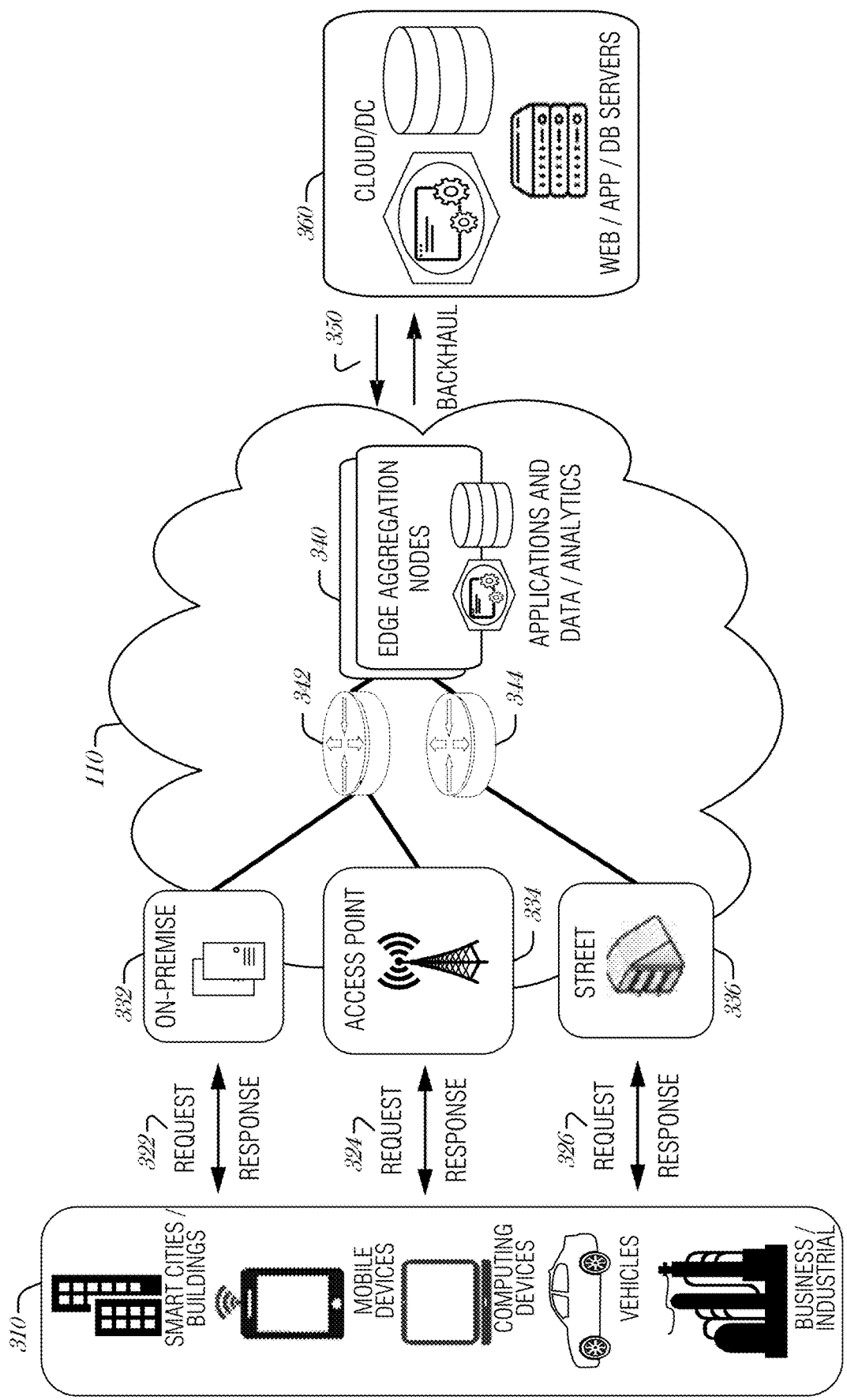
FIG. 3 illustrates an example approach for networking and services in an Edge computing system.

In FIG. 3, various client endpoints 310 (in the form of mobile devices, computers, autonomous vehicles, business computing equipment, industrial processing equipment) exchange requests and responses that are specific to the type of endpoint network aggregation. For instance, client endpoints 310 may obtain network access via a wired broadband network, by exchanging requests and responses 322 through an on-premise network system 332. Some client endpoints 310, such as mobile computing devices, may obtain network access via a wireless broadband network, by exchanging requests and responses 324 through an access point (e.g., cellular network tower) 334. Some client endpoints 310, such as autonomous vehicles may obtain network access for requests and responses 326 via a wireless vehicular network through a street-located network system 336. However, regardless of the type of network access, the TSP may deploy aggregation points 342, 344 within the Edge cloud 110 to aggregate traffic and requests. Thus, within the Edge cloud 110, the TSP may deploy various compute and storage resources, such as at Edge aggregation nodes 340, to provide requested content. The Edge aggregation nodes 340 and other systems of the Edge cloud 110 are connected to a cloud or data center 360, which uses a backhaul network 350 to fulfill higher-latency requests from a cloud/data center for websites, applications, database servers, etc. Additional or consolidated instances of the Edge aggregation nodes 340 and the aggregation points 342, 344, including those deployed on a single server framework, may also be present within the Edge cloud 110 or other areas of the TSP infrastructure.

In further examples, any of the compute nodes or devices discussed with reference to the present Edge computing systems and environment may be fulfilled based on the components depicted in FIGS. 4A and 4B. Respective Edge compute nodes may be embodied as a type of device, appliance, computer, or other "thing" capable of communicating with other Edge, networking, or endpoint components. For example, an Edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 4A:
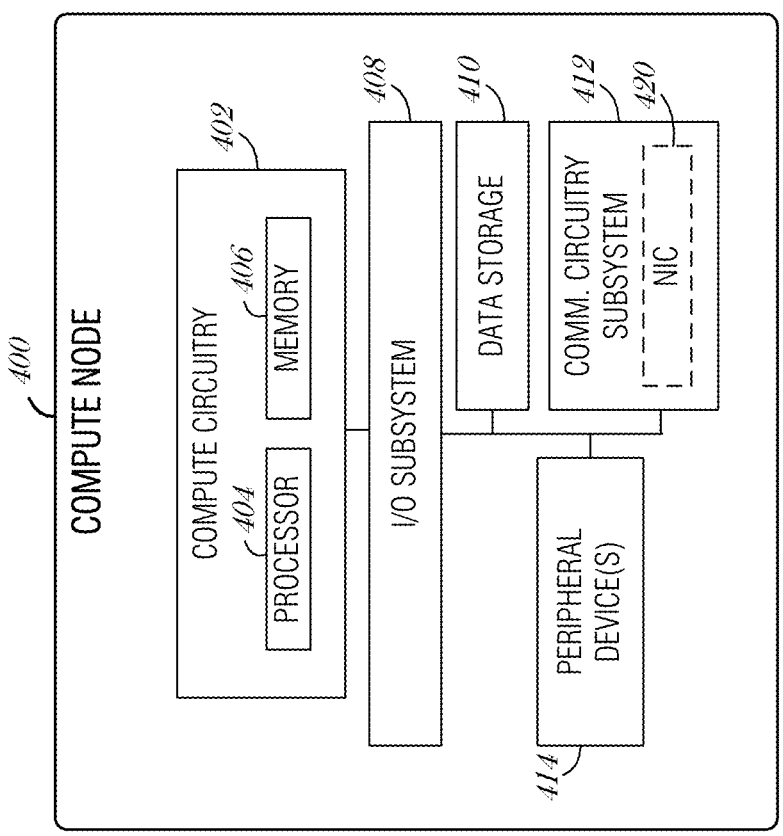
FIG. 4A provides an overview of example components for compute deployed at a compute node in an Edge computing system.

In the simplified example depicted in FIG. 4A, an Edge compute node 400 includes a compute engine (also referred to herein as "compute circuitry") 402, an input/output (I/O) subsystem (also referred to herein as "I/O circuitry") 408, data storage (also referred to herein as "data storage circuitry") 410, a communication circuitry subsystem 412, and, optionally, one or more peripheral devices (also referred to herein as "peripheral device circuitry") 414. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 400 may be embodied as any type of engine, device, or collection of devices capable of performing various compute functions. In some examples, the compute node 400 may be embodied as a single device such as an integrated circuit, an embedded system, a field-programmable gate array (FPGA), a system-on-a-chip (SOC), or other integrated system or device. In the illustrative example, the compute node 400 includes or is embodied as a processor (also referred to herein as "processor circuitry") 404 and a memory (also referred to herein as "memory circuitry") 406. The processor 404 may be embodied as any type of processor(s) capable of performing the functions described herein (e.g., executing an application). For example, the processor 404 may be embodied as a multi-core processor(s), a microcontroller, a processing unit, a specialized or special purpose processing unit, or other processor or processing/controlling circuit.

In some examples, the processor 404 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 404 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, storage disks, or AI hardware (e.g., GPUs or programmed FPGAs). Such an xPU may be designed to receive, retrieve and/or otherwise obtain programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 404 may work in coordination with each other to execute many types of operations and instructions within and on behalf of the compute node 400.

The memory 406 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device (e.g., memory circuitry) is any number of block addressable memory devices, such as those based on NAND or NOR technologies (for example, Single-Level Cell ("SLC"), Multi-Level Cell ("MLC"), Quad-Level Cell ("QLC"), Tri-Level Cell ("TLC"), or some other NAND). In some examples, the memory device(s) includes a byte-addressable write-in-place three dimensional crosspoint memory device, or other byte addressable write-in-place non-volatile memory (NVM) devices, such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric transistor random access memory (FeTRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, a combination of any of the above, or other suitable memory. A memory device may also include a three-dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may include a transistor-less stackable cross point architecture in which memory cells sit at the intersection of word lines and bit lines and are individually addressable and in which bit storage is based on a change in bulk resistance. In some examples, all or a portion of the memory 406 may be integrated into the processor 404. The memory 406 may store various software and data used during operation such as one or more applications, data operated on by the application(s), libraries, and drivers.

In some examples, resistor-based and/or transistor-less memory architectures include nanometer scale phase-change memory (PCM) devices in which a volume of phase-change material resides between at least two electrodes. Portions of the example phase-change material exhibit varying degrees of crystalline phases and amorphous phases, in which varying degrees of resistance between the at least two electrodes can be measured. In some examples, the phase-change material is a chalcogenide-based glass material. Such resistive memory devices are sometimes referred to as memristive devices that remember the history of the current that previously flowed through them. Stored data is retrieved from example PCM devices by measuring the electrical resistance, in which the crystalline phases exhibit a relatively lower resistance value(s) (e.g., logical "0") when compared to the amorphous phases having a relatively higher resistance value(s) (e.g., logical "1").

Example PCM devices store data for long periods of time (e.g., approximately 10 years at room temperature). Write operations to example PCM devices (e.g., set to logical "0", set to logical "1", set to an intermediary resistance value) are accomplished by applying one or more current pulses to the at least two electrodes, in which the pulses have a particular current magnitude and duration. For instance, a long low current pulse (SET) applied to the at least two electrodes causes the example PCM device to reside in a low-resistance crystalline state, while a comparatively short high current pulse (RESET) applied to the at least two electrodes causes the example PCM device to reside in a high-resistance amorphous state.

In some examples, implementation of PCM devices facilitates non-von Neumann computing architectures that enable in-memory computing capabilities. Generally speaking, traditional computing architectures include a central processing unit (CPU) communicatively connected to one or more memory devices via a bus. As such, a finite amount of energy and time is consumed to transfer data between the CPU and memory, which is a known bottleneck of von Neumann computing architectures. However, PCM devices minimize and, in some cases, eliminate data transfers between the CPU and memory by performing some computing operations in-memory. Stated differently, PCM devices both store information and execute computational tasks. Such non-von Neumann computing architectures may implement vectors having a relatively high dimensionality to facilitate hyperdimensional computing, such as vectors having 10,000 bits. Relatively large bit width vectors enable computing paradigms modeled after the human brain, which also processes information analogous to wide bit vectors.

The compute circuitry 402 is communicatively coupled to other components of the compute node 400 via the I/O subsystem 408, which may be embodied as circuitry and/or components to facilitate input/output operations with the compute circuitry 402 (e.g., with the processor 404 and/or the main memory 406) and other components of the compute circuitry 402. For example, the I/O subsystem 408 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 408 may form a portion of a system-on-a-chip (SoC) and be incorporated, along with one or more of the processor 404, the memory 406, and other components of the compute circuitry 402, into the compute circuitry 402.

The one or more illustrative data storage devices/disks 410 may be embodied as one or more of any type(s) of physical device(s) configured for short-term or long-term storage of data such as, for example, memory devices, memory, circuitry, memory cards, flash memory, hard disk drives, solid-state drives (SSDs), and/or other data storage devices/disks. Individual data storage devices/disks 410 may include a system partition that stores data and firmware code for the data storage device/disk 410. Individual data storage devices/disks 410 may also include one or more operating system partitions that store data files and executables for operating systems depending on, for example, the type of compute node 400.

The communication circuitry 412 may be embodied as any communication circuit, device, or collection thereof, capable of enabling communications over a network between the compute circuitry 402 and another compute device (e.g., an Edge gateway of an implementing Edge computing system). The communication circuitry 412 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 412 includes a network interface controller (NIC) 420, which may also be referred to as a host fabric interface (HFI). The NIC 420 may be embodied as one or more add-in-boards, daughter cards, network interface cards, controller chips, chipsets, or other devices that may be used by the compute node 400 to connect with another compute device (e.g., an Edge gateway node). In some examples, the NIC 420 may be embodied as part of a system-on-a-chip (SoC) that includes one or more processors, or included on a multichip package that also contains one or more processors. In some examples, the NIC 420 may include a local processor (not shown) and/or a local memory (not shown) that are both local to the NIC 420. In such examples, the local processor of the NIC 420 may be capable of performing one or more of the functions of the compute circuitry 402 described herein. Additionally, or alternatively, in such examples, the local memory of the NIC 420 may be integrated into one or more components of the client compute node at the board level, socket level, chip level, and/or other levels.

Additionally, in some examples, a respective compute node 400 may include one or more peripheral devices 414. Such peripheral devices 414 may include any type of peripheral device found in a compute device or server such as audio input devices, a display, other input/output devices, interface devices, and/or other peripheral devices, depending on the particular type of the compute node 400. In further examples, the compute node 400 may be embodied by a respective Edge compute node (whether a client, gateway, or aggregation node) in an Edge computing system or like forms of appliances, computers, subsystems, circuitry, or other components.

Figure 4B:
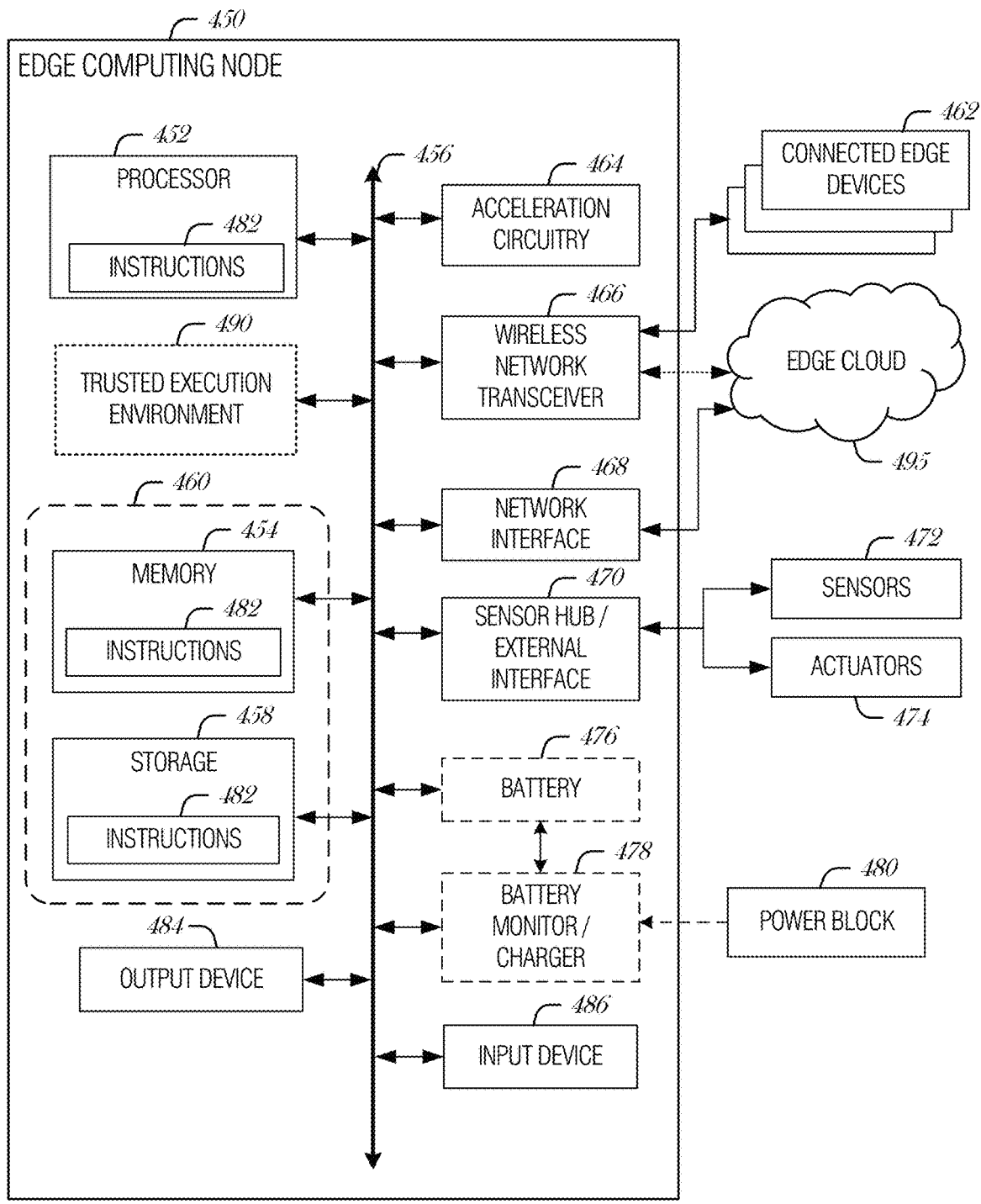
FIG. 4B provides a further overview of example components within a computing device in an Edge computing system.

In a more detailed example, FIG. 4B illustrates a block diagram of an example of components that may be present in an Edge computing node 450 for implementing the techniques (e.g., operations, processes, methods, and methodologies) described herein. This Edge computing node 450 provides a closer view of the respective components of node 400 when implemented as or as part of a computing device (e.g., as a mobile device, a base station, server, gateway, etc.). The Edge computing node 450 may include any combination of the hardware or logical components referenced herein, and it may include or couple with any device usable with an Edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the Edge computing node 450, or as components otherwise incorporated within a chassis of a larger system.

The Edge computing device 450 may include processing circuitry in the form of a processor 452, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 452 may be a part of a system on a chip (SoC) in which the processor 452 and other components are formed into a single integrated circuit, or a single package, such as the Edison™ or Galileo™ SoC boards from Intel Corporation, Santa Clara, Calif. As an example, the processor 452 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, Calif., a MIPS®-based design from MIPS Technologies, Inc. of Sunnyvale, Calif., an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 452 and accompanying circuitry may be provided in a single socket form factor, multiple socket form factor, or a variety of other formats, including in limited hardware configurations or configurations that include fewer than all elements shown in FIG. 4B.

The processor 452 may communicate with a system memory 454 over an interconnect 456 (e.g., a bus). Any number of memory devices may be used to provide for a given amount of system memory. As examples, the memory 454 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-

3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 458 may also couple to the processor 452 via the interconnect 456. In an example, the storage 458 may be implemented via a solid-state disk drive (SSDD). Other devices that may be used for the storage 458 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 458 may be on-die memory or registers associated with the processor 452. However, in some examples, the storage 458 may be implemented using a micro hard disk drive (HDD). Further, any number of new technologies may be used for the storage 458 in addition to, or instead of, the technologies described, such resistance change memories, phase change memories, holographic memories, or chemical memories, among others.

The components may communicate over the interconnect 456. The interconnect 456 may include any number of technologies, including industry standard architecture (ISA), extended ISA (EISA), peripheral component interconnect (PCI), peripheral component interconnect extended (PCIx), PCI express (PCIe), or any number of other technologies. The interconnect 456 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 456 may couple the processor 452 to a transceiver 466, for communications with the connected Edge devices 462. The transceiver 466 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected Edge devices 462. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 466 (or multiple transceivers) may communicate using multiple standards or radios for communications at a different range. For example, the Edge computing node 450 may communicate with close devices, e.g., within about 10 meters, using a local transceiver based on Bluetooth Low Energy (BLE), or another low power radio, to save power. More distant connected Edge devices 462, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 466 (e.g., a radio transceiver) may be included to communicate with devices or services in a cloud (e.g., an Edge cloud 495) via local or wide area network protocols. The wireless network transceiver 466 may be a low-power wide-area (LPWA) transceiver that follows the IEEE 802.15.4, or IEEE 802.15.4g standards, among others. The Edge computing node 450 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 466, as described herein. For example, the transceiver 466 may include a cellular transceiver that uses spread spectrum (SPA/SAS) communications for implementing high-speed communications. Further, any number of other protocols may be used, such as Wi-Fi® networks for medium speed communications and provision of network communications. The transceiver 466 may include radios that are compatible with any number of 3 GPP (Third Generation Partnership Project) specifications, such as Long Term Evolution (LTE) and 5th Generation (5G) communication systems, discussed in further detail at the end of the present disclosure. A network interface controller (NIC) 468 may be included to provide a wired communication to nodes of the Edge cloud 495 or to other devices, such as the connected Edge devices 462 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 468 may be included to enable connecting to a second network, for example, a first NIC 468 providing communications to the cloud over Ethernet, and a second NIC 468 providing communications to other devices over another type of network.

Given the variety of types of applicable communications from the device to another component or network, applicable communications circuitry used by the device may include or be embodied by any one or more of components 464, 466, 468, or 470. Accordingly, in various examples, applicable means for communicating (e.g., receiving, transmitting, etc.) may be embodied by such communications circuitry.

The Edge computing node 450 may include or be coupled to acceleration circuitry 464, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific Edge computing tasks for service management and service operations discussed elsewhere in this document.

The interconnect 456 may couple the processor 452 to a sensor hub or external interface 470 that is used to connect additional devices or subsystems. The devices may include sensors 472, such as accelerometers, level sensors, flow sensors, optical light sensors, camera sensors, temperature sensors, global navigation system (e.g., GPS) sensors, pressure sensors, barometric pressure sensors, and the like. The hub or interface 470 further may be used to connect the Edge computing node 450 to actuators 474, such as power switches, valve actuators, an audible sound generator, a visual warning device, and the like.

In some optional examples, various input/output (I/O) devices may be present within or connected to, the Edge computing node 450. For example, a display or other output device 484 may be included to show information, such as sensor readings or actuator position. An input device 486, such as a touch screen or keypad may be included to accept input. An output device 484 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the Edge computing node 450. A display or console hardware, in the context of the present system, may be used to provide output and receive input of an Edge computing system; to manage components or services of an Edge computing system; identify a state of an Edge computing component or service; or to conduct any other number of management or administration functions or service use cases.

A battery 476 may power the Edge computing node 450, although, in examples in which the Edge computing node 450 is mounted in a fixed location, it may have a power supply coupled to an electrical grid, or the battery may be used as a backup or for temporary capabilities. The battery 476 may be a lithium ion battery, or a metal-air battery, such as a zinc-air battery, an aluminum-air battery, a lithium-air battery, and the like.

A battery monitor/charger 478 may be included in the Edge computing node 450 to track the state of charge (SoCh) of the battery 476, if included. The battery monitor/charger 478 may be used to monitor other parameters of the battery 476 to provide failure predictions, such as the state of health (SoH) and the state of function (SoF) of the battery 476. The battery monitor/charger 478 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 478 may communicate the information on the battery 476 to the processor 452 over the interconnect 456. The battery monitor/charger 478 may also include an analog-to-digital (ADC) converter that enables the processor 452 to directly monitor the voltage of the battery 476 or the current flow from the battery 476. The battery parameters may be used to determine actions that the Edge computing node 450 may perform, such as transmission frequency, mesh network operation, sensing frequency, and the like.

A power block 480, or other power supply coupled to a grid, may be coupled with the battery monitor/charger 478 to charge the battery 476. In some examples, the power block 480 may be replaced with a wireless power receiver to obtain the power wirelessly, for example, through a loop antenna in the Edge computing node 450. A wireless battery charging circuit, such as an LTC4020 chip from Linear Technologies of Milpitas, Calif., among others, may be included in the battery monitor/charger 478. The specific charging circuits may be selected based on the size of the battery 476, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 458 may include instructions 482 in the form of software, firmware, or hardware commands to implement the techniques described herein. Although such instructions 482 are shown as code blocks included in the memory 454 and the storage 458, it may be understood that any of the code blocks may be replaced with hardwired circuits, for example, built into an application specific integrated circuit (ASIC).

In an example, the instructions 482 provided via the memory 454, the storage 458, or the processor 452 may be embodied as a non-transitory, machine-readable medium 460 including code to direct the processor 452 to perform electronic operations in the Edge computing node 450. The processor 452 may access the non-transitory, machine-readable medium 460 over the interconnect 456. For instance, the non-transitory, machine-readable medium 460 may be embodied by devices described for the storage 458 or may include specific storage units such as storage devices and/or storage disks that include optical disks (e.g., digital versatile disk (DVD), compact disk (CD), CD-ROM, Blu-ray disk), flash drives, floppy disks, hard drives (e.g., SSDs), or any number of other hardware devices in which information is stored for any duration (e.g., for extended time periods, permanently, for brief instances, for temporarily buffering, and/or caching). The non-transitory, machine-readable medium 460 may include instructions to direct the processor 452 to perform a specific sequence or flow of actions, for example, as described with respect to the flowchart(s) and block diagram(s) of operations and functionality depicted above. As used herein, the terms "machine-readable medium" and "computer-readable medium" are interchangeable. As used herein, the term "non-transitory computer-readable medium" is expressly defined to include any type of computer readable storage device and/or storage disk and to exclude propagating signals and to exclude transmission media.

Also in a specific example, the instructions 482 on the processor 452 (separately, or in combination with the instructions 482 of the machine readable medium 460) may configure execution or operation of a trusted execution environment (TEE) 490. In an example, the TEE 490 operates as a protected area accessible to the processor 452 for secure execution of instructions and secure access to data. Various implementations of the TEE 490, and an accompanying secure area in the processor 452 or the memory 454 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 450 through the TEE 490 and the processor 452.

While the illustrated examples of FIG. 4A and FIG. 4B include example components for a compute node and a computing device, respectively, examples disclosed herein are not limited thereto. As used herein, a "computer" may include some or all of the example components of FIGS. 4A and/or 4B in different types of computing environments. Example computing environments include Edge computing devices (e.g., Edge computers) in a distributed networking arrangement such that particular ones of participating Edge computing devices are heterogenous or homogeneous devices. As used herein, a "computer" may include a personal computer, a server, user equipment, an accelerator, etc., including any combinations thereof. In some examples, distributed networking and/or distributed computing includes any number of such Edge computing devices as illustrated in FIGS. 4A and/or 4B, each of which may include different sub-components, different memory capacities, I/O capabilities, etc. For example, because some implementations of distributed networking and/or distributed computing are associated with particular desired functionality, examples disclosed herein include different combinations of components illustrated in FIGS. 4A and/or 4B to satisfy functional objectives of distributed computing tasks. In some examples, the term "compute node" or "computer" only includes the example processor 404, memory 406 and I/O subsystem 408 of FIG. 4A. In some examples, one or more objective functions of a distributed computing task(s) rely on one or more alternate devices/structure located in different parts of an Edge networking environment, such as devices to accommodate data storage (e.g., the example data storage 410), input/output capabilities (e.g., the example peripheral device(s) 414), and/or network communication capabilities (e.g., the example NIC 420).

In some examples, computers operating in a distributed computing and/or distributed networking environment (e.g., an Edge network) are structured to accommodate particular objective functionality in a manner that reduces computational waste. For instance, because a computer includes a subset of the components disclosed in FIGS. 4A and 4B, such computers satisfy execution of distributed computing objective functions without including computing structure that would otherwise be unused and/or underutilized. As such, the term "computer" as used herein includes any combination of structure of FIGS. 4A and/or 4B that is capable of satisfying and/or otherwise executing objective functions of distributed computing tasks. In some examples, computers are structured in a manner commensurate to corresponding distributed computing objective functions in a manner that downscales or upscales in connection with dynamic demand. In some examples, different computers are invoked and/or otherwise instantiated in view of their ability to process one or more tasks of the distributed computing request(s), such that any computer capable of satisfying the tasks proceed with such computing activity.

In the illustrated examples of FIGS. 4A and 4B, computing devices include operating systems. As used herein, an "operating system" is software to control example computing devices, such as the example Edge compute node 400 of FIG. 4A and/or the example Edge compute node 450 of FIG. 4B. Example operating systems include, but are not limited to consumer-based operating systems (e.g., Microsoft® Windows® 10, Google® Android® OS, Apple® Mac® OS, etc.). Example operating systems also include, but are not limited to industry-focused operating systems, such as real-time operating systems, hypervisors, etc. An example operating system on a first Edge compute node may be the same or different than an example operating system on a second Edge compute node. In some examples, the operating system invokes alternate software to facilitate one or more functions and/or operations that are not native to the operating system, such as particular communication protocols and/or interpreters. In some examples, the operating system instantiates various functionalities that are not native to the operating system. In some examples, operating systems include varying degrees of complexity and/or capabilities. For instance, a first operating system corresponding to a first Edge compute node includes a real-time operating system having particular performance expectations of responsivity to dynamic input conditions, and a second operating system corresponding to a second Edge compute node includes graphical user interface capabilities to facilitate end-user I/O.

The instructions 482 may further be transmitted or received over a communications network using a transmission medium via the wireless network transceiver 466 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards, IEEE 802.15.4 family of standards, a Long Term Evolution (LTE) family of standards, a Universal Mobile Telecommunications System (UMTS) family of standards, peer-to-peer (P2P) networks, a next generation (NG)/5th generation (5G) standards among others.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry", "processing circuitry", or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (WITS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth(r), Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety re-lated applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz), IEEE 802.11bd based systems, etc.

Aspects described herein can be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-

790 MHz, 3400-3600 MHz, 3400-3800 MHz, 3800-4200 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7085 MHz and 5925-6425 MHz band (note: under consideration in US and EU, respectively. Next generation Wi-Fi system is expected to include the 6 GHz spectrum as operating band, but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHz, 3800-4200 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Figure 5A:
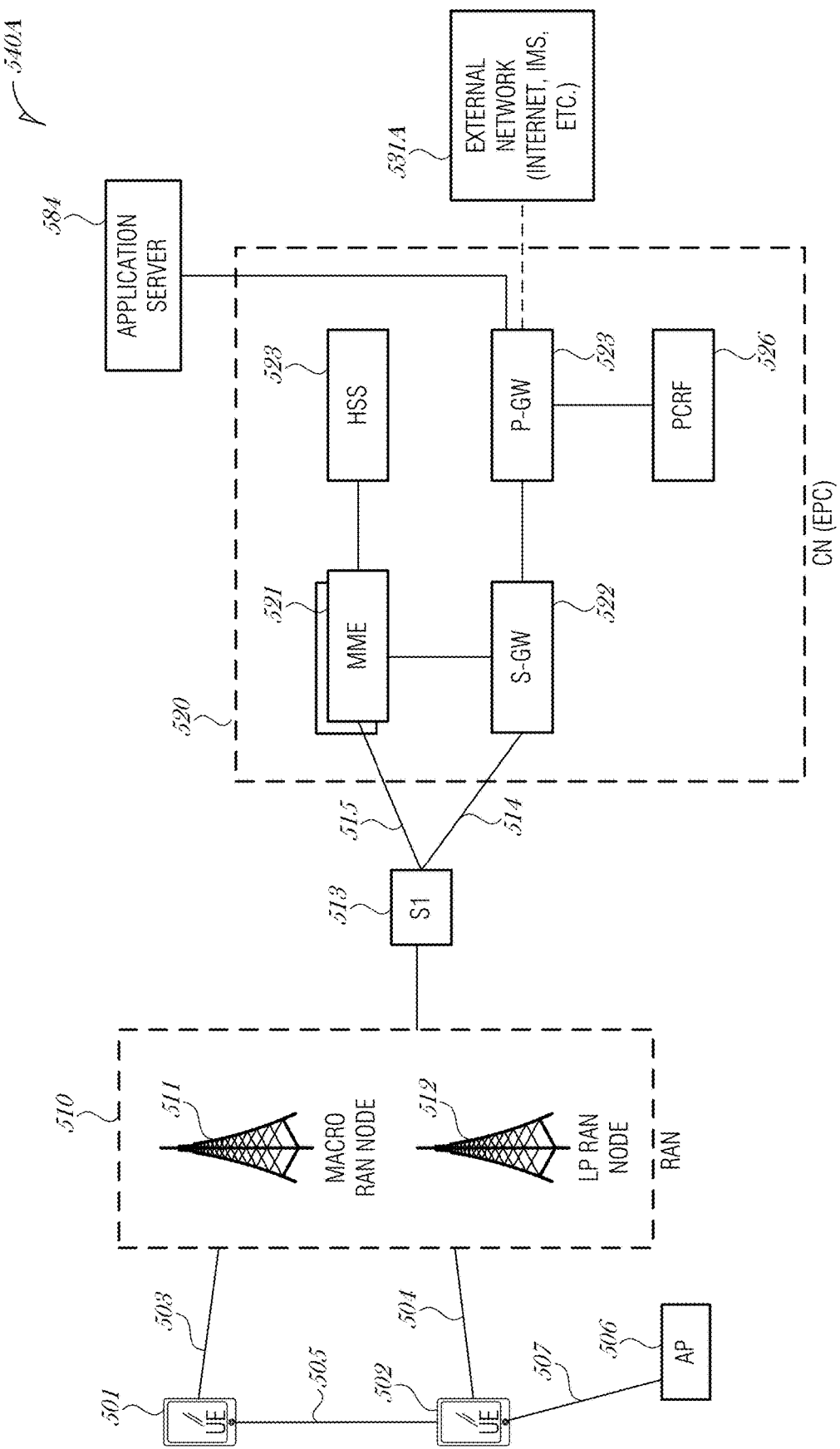
FIG. 5A illustrates an architecture of a network, according to an embodiment.

FIG. 5A illustrates an architecture of a network, according to an embodiment. The network 540A includes 3GPP LTE/4G and NG network functions that may be extended to 6G functions. Accordingly, although 5G will be referred to, it is to be understood that this may apply to 6G structures, systems, and functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 540A is shown to include user equipment (UE) 501 and UE 502. The UEs 501 and 502 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 501 and 502 can be collectively referred to herein as UE 501, and UE 501 can be used to perform one or more of the techniques disclosed herein.

Any of the radio links described herein (e.g., as used in the network 540A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHz and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 501 and 502 can comprise an Internet-of-Things (IoT) UE or a Cellular IoT (CIoT) UE, which can comprise a network access layer designed for low-power IoT applications utilizing short-lived UE connections. In some aspects, any of the UEs 501 and 502 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 501 and 502 can include enhanced MTC (eMTC) UEs or further enhanced MTC (FeMTC) UEs.

The UEs 501 and 502 may be configured to connect, e.g., communicatively couple, with a radio access network (RAN) 510. The RAN 510 may be, for example, an Evolved Universal Mobile Telecommunications System (UMTS) Terrestrial Radio Access Network (E-UTRAN), a NextGen RAN (NG RAN), or some other type of RAN.

The UEs 501 and 502 utilize connections 503 and 504, respectively, each of which comprises a physical communications interface or layer (discussed in further detail below); in this example, the connections 503 and 504 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a 6G protocol, and the like.

In an aspect, the UEs 501 and 502 may further directly exchange communication data via a ProSe interface 505. The ProSe interface 505 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 502 is shown to be configured to access an access point (AP) 506 via connection 507. The connection 507 can comprise a local wireless connection, such as, for example, a connection consistent with any IEEE 802.11 protocol, according to which the AP 506 can comprise a wireless fidelity (WiFi®) router. In this example, the AP 506 is shown to be connected to the Internet without connecting to the core network of the wireless system (described in further detail below).

The RAN 510 can include one or more access nodes that enable the connections 503 and 504. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 511 and 512 can be transmission/reception points (TRPs). In instances when the communication nodes 511 and 512 are NodeBs (e.g., eNBs or gNBs), one or more TRPs can function within the communication cell of the NodeBs. The RAN 510 may include one or more RAN nodes for providing macrocells, e.g., macro RAN node 511, and one or more RAN nodes for providing femtocells or picocells (e.g., cells having smaller coverage areas, smaller user capacity, or higher bandwidth compared to macrocells), e.g., low power (LP) RAN node 512.

Any of the RAN nodes 511 and 512 can terminate the air interface protocol and can be the first point of contact for the UEs 501 and 502. In some aspects, any of the RAN nodes 511 and 512 can fulfill various logical functions for the RAN 510 including, but not limited to, radio network controller (RNC) functions such as radio bearer management, uplink and downlink dynamic radio resource management and data packet scheduling, and mobility management. In an example, any of the nodes 511 and/or 512 can be a gNB, an eNB, or another type of RAN node.

The RAN 510 is shown to be communicatively coupled to a core network (CN) 520 via an S1 interface 513. In aspects, the CN 520 may be an evolved packet core (EPC) network, a NextGen Packet Core (NPC) network, or some other type of CN (e.g., as illustrated in reference to FIGS. 5B-5C). In this aspect, the S1 interface 513 is split into two parts: the S1-U interface 514, which carries traffic data between the RAN nodes 511 and 512 and the serving gateway (S-GW) 522, and the S1-mobility management entity (MME) interface 515, which is a signaling interface between the RAN nodes 511 and 512 and MMEs 521.

In this aspect, the CN 520 comprises the MMEs 521, the S-GW 522, the Packet Data Network (PDN) Gateway (P-GW) 523, and a home subscriber server (HSS) 524. The MMEs 521 may be similar in function to the control plane of legacy Serving General Packet Radio Service (GPRS) Support Nodes (SGSN). The MMEs 521 may manage mobility aspects in access such as gateway selection and tracking area list management. The HSS 524 may comprise a database for network users, including subscription-related information to support the network entities' handling of communication sessions. The CN 520 may comprise one or several HSSs 524, depending on the number of mobile subscribers, on the capacity of the equipment, on the organization of the network, etc. For example, the HSS 524 can provide support for routing/roaming, authentication, authorization, naming/addressing resolution, location dependencies, etc.

The S-GW 522 may terminate the S1 interface 513 towards the RAN 510, and route data packets between the RAN 510 and the CN 520. In addition, the S-GW 522 may be a local mobility anchor point for inter-RAN node handovers and also may provide an anchor for inter-3GPP mobility. Other responsibilities of the S-GW 522 may include a lawful intercept, charging, and some policy enforcement.

The P-GW 523 may terminate an SGi interface toward a PDN. The P-GW 523 may route data packets between the EPC network 520 and external networks such as a network including the application server 584 (alternatively referred to as application function (AF)) via an Internet Protocol (IP) interface 525. The P-GW 523 can also communicate data to other external networks 531A, which can include the Internet, IP multimedia subsystem (IPS) network, and other networks. Generally, the application server 584 may be an element offering applications that use IP bearer resources with the core network (e.g., UMTS Packet Services (PS) domain, LTE PS data services, etc.). In this aspect, the P-GW 523 is shown to be communicatively coupled to an application server 584 via an IP interface 525. The application server 584 can also be configured to support one or more communication services (e.g., Voice-over-Internet Protocol (VoIP) sessions, PTT sessions, group communication sessions, social networking services, etc.) for the UEs 501 and 502 via the CN 520.

The P-GW 523 may further be a node for policy enforcement and charging data collection. Policy and Charging Rules Function (PCRF) 526 is the policy and charging control element of the CN 520. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 526 may be communicatively coupled to the application server 584 via the P-GW 523.

In some aspects, the communication network 540A can be an IoT network or a 5G or 6G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called MulteFire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture (or 6G system architecture) can include the RAN 510 and a 5G network core (5GC) 520. The NG-RAN 510 can include a plurality of nodes, such as gNBs and NG-eNBs. The core network 520 (e.g., a 5G core network/5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes. In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 5B:
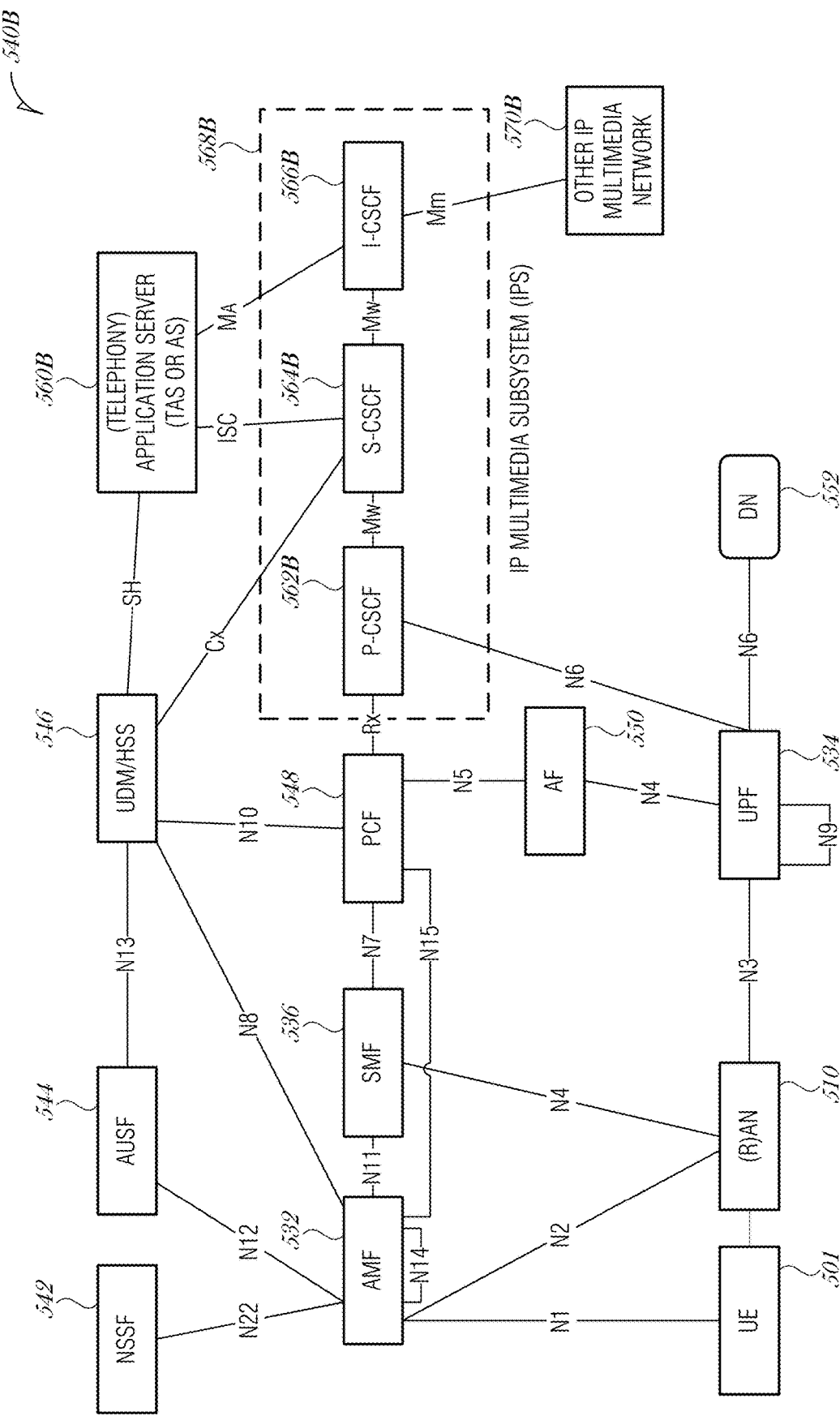
FIG. 5B illustrates a non-roaming 5G system architecture, according to an embodiment.

FIG. 5B illustrates a non-roaming 5G system architecture, according to an embodiment. In particular, FIG. 5B illustrates a 5G system architecture 540B in a reference point representation, which may be extended to a 6G system architecture. More specifically, UE 502 can be in communication with RAN 510 as well as one or more other 5GC network entities. The 5G system architecture 540B includes a plurality of network functions (NFs), such as an AMF 532, session management function (SMF) 536, policy control function (PCF) 548, application function (AF) 550, UPF 534, network slice selection function (NSSF) 542, authentication server function (AUSF) 544, and unified data management (UDM)/home subscriber server (HSS) 546.

The UPF 534 can provide a connection to a data network (DN) 552, which can include, for example, operator services, Internet access, or third-party services. The AMF 532 can be used to manage access control and mobility and can also include network slice selection functionality. The AMF 532 may provide UE-based authentication, authorization, mobility management, etc., and may be independent of the access technologies. The SMF 536 can be configured to set up and manage various sessions according to network policy. The SMF 536 may thus be responsible for session management and allocation of IP addresses to UEs. The SMF 536 may also select and control the UPF 534 for data transfer. The SMF 536 may be associated with a single session of a UE 501 or multiple sessions of the UE 501. This is to say that the UE 501 may have multiple 5G sessions. Different SMFs may be allocated to each session. The use of different SMFs may permit each session to be individually managed. As a consequence, the functionalities of each session may be independent of each other.

The UPF 534 can be deployed in one or more configurations according to the desired service type and may be connected with a data network. The PCF 548 can be configured to provide a policy framework using network slicing, mobility management, and roaming (similar to PCRF in a 4G communication system). The UDM can be configured to store subscriber profiles and data (similar to an HSS in a 4G communication system).

The AF 550 may provide information on the packet flow to the PCF 548 responsible for policy control to support a desired QoS. The PCF 548 may set mobility and session management policies for the UE 501. To this end, the PCF 548 may use the packet flow information to determine the appropriate policies for proper operation of the AMF 532 and SMF 536. The AUSF 544 may store data for UE authentication.

In some aspects, the 5G system architecture 540B includes an IP multimedia subsystem (IMS) 568B as well as a plurality of IP multimedia core network subsystem entities, such as call session control functions (CSCFs). More specifically, the IMS 568B includes a CSCF, which can act as a proxy CSCF (P-CSCF) 562B, a serving CSCF (S-CSCF) 564B, an emergency CSCF (E-CSCF) (not illustrated in FIG. 5B), or interrogating CSCF (I-CSCF) 566B. The P-CSCF 562B can be configured to be the first contact point for the UE 502 within the IM subsystem (IMS) 568B. The S-CSCF 564B can be configured to handle the session states in the network, and the E-CSCF can be configured to handle certain aspects of emergency sessions such as routing an emergency request to the correct emergency center or PSAP. The I-CSCF 566B can be configured to function as the contact point within an operator's network for all IMS connections destined to a subscriber of that network operator, or a roaming subscriber currently located within that network operator's service area. In some aspects, the I-CSCF 566B can be connected to another IP multimedia network 570E, e.g., an IMS operated by a different network operator.

In some aspects, the UDM/HSS 546 can be coupled to an application server 560E, which can include a telephony application server (TAS) or another application server (AS). The AS 560B can be coupled to the IMS 568B via the S-CSCF 564B or the I-CSCF 566B.

A reference point representation shows that interaction can exist between corresponding NF services. For example, FIG. 5B illustrates the following reference points: N1 (between the UE 502 and the AMF 532), N2 (between the RAN 510 and the AMF 532), N3 (between the RAN 510 and the UPF 534), N4 (between the SMF 536 and the UPF 534), N5 (between the PCF 548 and the AF 550, not shown), N6 (between the UPF 534 and the DN 552), N7 (between the SMF 536 and the PCF 548, not shown), N8 (between the UDM 546 and the AMF 532, not shown), N9 (between two UPFs 534, not shown), N10 (between the UDM 546 and the SMF 536, not shown), N11 (between the AMF 532 and the SMF 536, not shown), N12 (between the AUSF 544 and the AMF 532, not shown), N13 (between the AUSF 544 and the UDM 546, not shown), N14 (between two AMFs 532, not shown), N15 (between the PCF 548 and the AMF 532 in case of a non-roaming scenario, or between the PCF 548 and a visited network and AMF 532 in case of a roaming scenario, not shown), N16 (between two SMFs, not shown), and N22 (between AMF 532 and NSSF 542, not shown). Other reference point representations not shown in FIG. 5B can also be used.

Figure 5C:
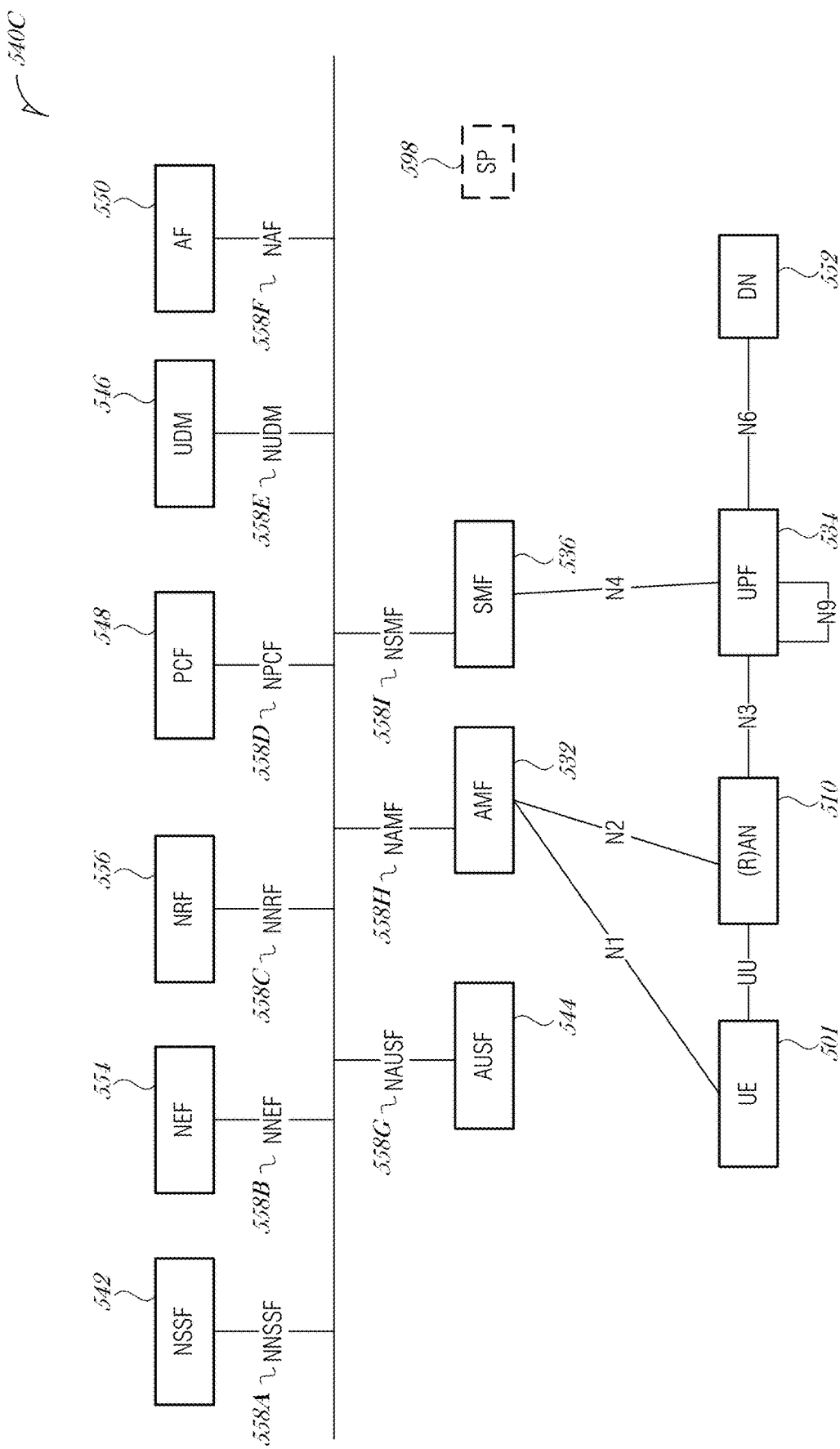
FIG. 5C illustrates a 5G system architecture and a service-based representation, according to an embodiment.

FIG. 5C illustrates a 5G system architecture 540C and a service-based representation. In addition to the network entities illustrated in FIG. 5B, system architecture 540C can also include a network exposure function (NEF) 554 and a network repository function (NRF) 556. In some aspects, 5G system architectures can be service-based and interaction between network functions can be represented by corresponding point-to-point reference points Ni or as service-based interfaces.

In some aspects, as illustrated in FIG. 5C, service-based representations can be used to represent network functions within the control plane that enable other authorized network functions to access their services. In this regard, 5G system architecture 540C can include the following service-based interfaces: Namf 558H (a service-based interface exhibited by the AMF 132), Nsmf 558I (a service-based interface exhibited by the SMF 536), Nnef 558B (a service-based interface exhibited by the NEF 554), Npcf 558D (a service-based interface exhibited by the PCF 548), a Nudm 558E (a service-based interface exhibited by the UDM 546), Naf 558F (a service-based interface exhibited by the AF 550), Nnrf 558C (a service-based interface exhibited by the NRF 556), Nnssf 558A (a service-based interface exhibited by the NSSF 542), Nausf 558G (a service-based interface exhibited by the AUSF 544). Other service-based interfaces (e.g., Nudr, N5g-eir, and Nudsf) not shown in FIG. 5C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 6:
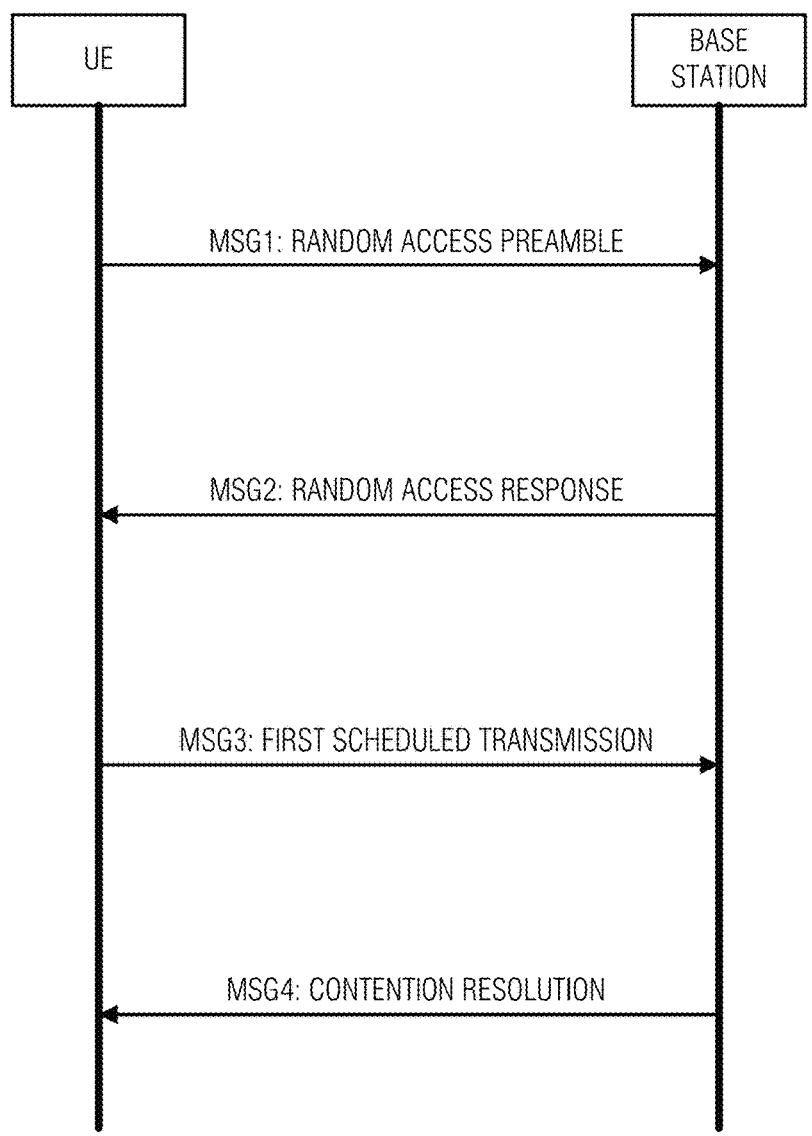
FIG. 6 illustrates a 4-step RACH procedure, according to an embodiment.

FIG. 6 illustrates a 4-step RACH procedure, according to an embodiment. A 4-step procedure used for initial contention-based random access (also referred to as a "random access procedure" or "RACH procedure") is defined. Each device in the mobile network (e.g., cellular) system must go through the random access process (contention based or non-contention based) to attach to the network. On a device power-up, a UE detects the synchronization channels (primary synchronization signal (PSS) and secondary synchronization signal (SSS)) and the primary control information to perform the random access channel (RACH) process. There is a set of preamble sequences for the devices to pick one randomly and transmit to the base station. The base station receives the sequences and makes the contention resolution, assigns a temporary ID, and goes through the radio resource control (RRC) attach process. The base station may be used in various implementation setting including commercial, industrial, or residential, to serve customers, enterprises, private networks, and the like. Base stations as described herein are not limited to private telco companies.

As illustrated in FIG. 6, in the first step of the 4-step procedure, the UE transmits a Physical Random Access Channel (PRACH) preamble in the uplink by selecting one preamble signature (e.g., Msg1: random access preamble in FIG. 3). This allows the gNB to estimate the delay between the gNB and the UE for subsequent UL timing adjustment. There are total on N number of preamble sequences, e.g., each LTE and 5G NR cells have a total of 64 preamble sequences available and UE randomly selects one of these sequences.

There is a possibility that multiple UEs transmit the same preamble sequence at the same PRACH resources. In this case, the same PRACH preamble from multiple UEs reaches the base station (e.g., network, eNB, gNB, etc.) at the same time. Subsequently, the contention-based RACH process will take place. The base station will execute additional processes (contention resolution) at later step to resolve these contentions.

In the second step, the base station (e.g., gNB) responds with a random access response (RAR), which carries timing advanced (TA) command information and uplink grant for the uplink transmission.

In the third step, the UE transmits a layer 1/layer 2 (L1/L2) message (e.g., Msg3) over the Physical Uplink Shared Channel (PUSCH), which may carry contention resolution ID and/or other information. The signaling messages and information sent by the UE varies across different RA scenarios. The Msg3 may be a message transmitted on the uplink shared channel (UL-SCH) containing a Cell Radio Network Temporary Identifier (C-RNTI) Medium Access Control (MAC) Control Element (CE) or Common Control Channel (CCCH) Service Data Unit (SDU), submitted from the upper layer and associated with the UE Contention Resolution Identity, as part of a Random Access procedure.

In the fourth step, the base station sends a contention resolution message (e.g., Msg4). In an example implementation, after the UE sends Msg3, a contention resolution timer starts. The base station performs contention resolution using either C-RNTI on the Physical Downlink Control Channel (PDCCH) or the UE Contention Resolution Identity IE on the Physical Downlink Shared Channel (PDSCH). The UE monitors the PDCCH before the timer expires and considers the contention resolution successful if 1) the UE obtains the C-RNTI over the PDCCH or 2) the UE obtains the temporary C-RNTI over the PDCCH and the MAC PDU is successfully decoded, with the UE Contention Resolution Identity IE received over the PDSCH being the same as that carried in Msg3 sent by the UE.

The RACH preamble may be sent by any device in wireless range. The problem comes when a rogue device transmits a preamble sequence that is allocated by the base station. A rouge device may select a preamble and contend in the RACH channel but not respond with subsequent messages. Such action would waste some RACH, control, and shared channel resources and may prevent genuine devices from attaching with the network. The rogue device may select another preamble and try at another RACH resource to cause further harm.

To counter this type of activity, the base station may use the estimates of the higher-order statistics of multiple device impairments such as fourth-order moment of the noise (Kurtosis) and frequency offset of these UEs to identify these rogue devices and bar them from accessing the RACH resources.

Several advantages exist by using this implementation. First, the physical layer properties-based mitigation schemes are transparent to the client side. Also, they do not require additional hardware to implement. No additional standardization or change in current standards are required. Finally, such processes may be implemented based on the measurements already available from the lower layers.

There are three situations that may occur when a device transmits a preamble sequence. In the first case, the device may be the only device transmitting during the time slot. In the second case, the device may be transmitting along with other devices in the same slot, each device using a different preamble. In the third case, the device may be transmitting with one or more other devices that are all using the same preamble.

In any of these cases, it is important to identify any rogue device(s) and bar them from accessing the RACH resources (i.e., the resources needed for the signaling of the subsequent messages after Msg1 as shown in FIG. 6), otherwise these rogue devices can keep sending random access preambles in every possible RACH opportunity, which will (i) waste the precious RACH resources and (ii) may prevent legitimate devices from attaching with the network.

Because a RACH is for initial access and because the rogue device(s) can use different sequence every time it access the RACH resources, the base station does not have any mechanism to identify particular devices. This is because these devices are not given any IDs by the network yet. However, estimates of the higher-order statistics of multiple device impairments, e.g., fourth-order moment of the noise (Kurtosis), frequency offset, etc. may be used to uniquely identify these devices to bar them from accessing the RACH resources.

To calculate an estimate of the higher-order statistics of multiple device impairments, the base state collects the received signals of the RACH preamble transmission. These received signals will be used to generate the estimate of the higher-order statistics of multiple device impairments.

The third case is a very rare event, but if that happens, the BS may not be able to differentiate the devices. Both devices may need to wait for a random period of time and transmit their RACH sequence again in another random slot. The issue will be resolved in the next attempt because it is unlikely that the devices will use the same preamble in the next attempt.

For the first and second cases, the BS receiver takes the correlation of all possible RACH sequences with the received RACH signal and determines the devices presence. The BS also estimates the higher-order statistics of the received signal properties. The high-order statistics of properties vary very slowly. In an embodiment, the combination of two or more higher-order statistics is used as the temporary fingerprint of the device. Using this fingerprint, when the BS experiences repeated failures of RACH processes from a particular device (e.g., no response from the device or failed messages from the device), the BS is able to bar the rogue device.

To bar the rogue device, when the BS observes the signature from multiple RACH failing (rouge) devices and the RACH resources are scarce, the BS is able to stop allocating resources for attach process for the particular RACH attempts from the rouge device. In particular, the BS is configured to stop allocating the resources for the signaling to transmit the subsequent messages after the first message, Msg1. This will effectively bar the device from the RACH process.

If the rogue device obtains access, but does not utilize the access for N number of times within X period of time, then the BS may bar or block the device from access for Y period of time. The time that the device is barred or blocked may be as high as infinity. If the rogue device uses high priority access class and gains access N number of times within X period of time, but does not actually utilize the connection, the BS may: (a) deprioritize the device to a lower Class for Y period of time, or (b) bar access for Z period of time.

Figure 7:
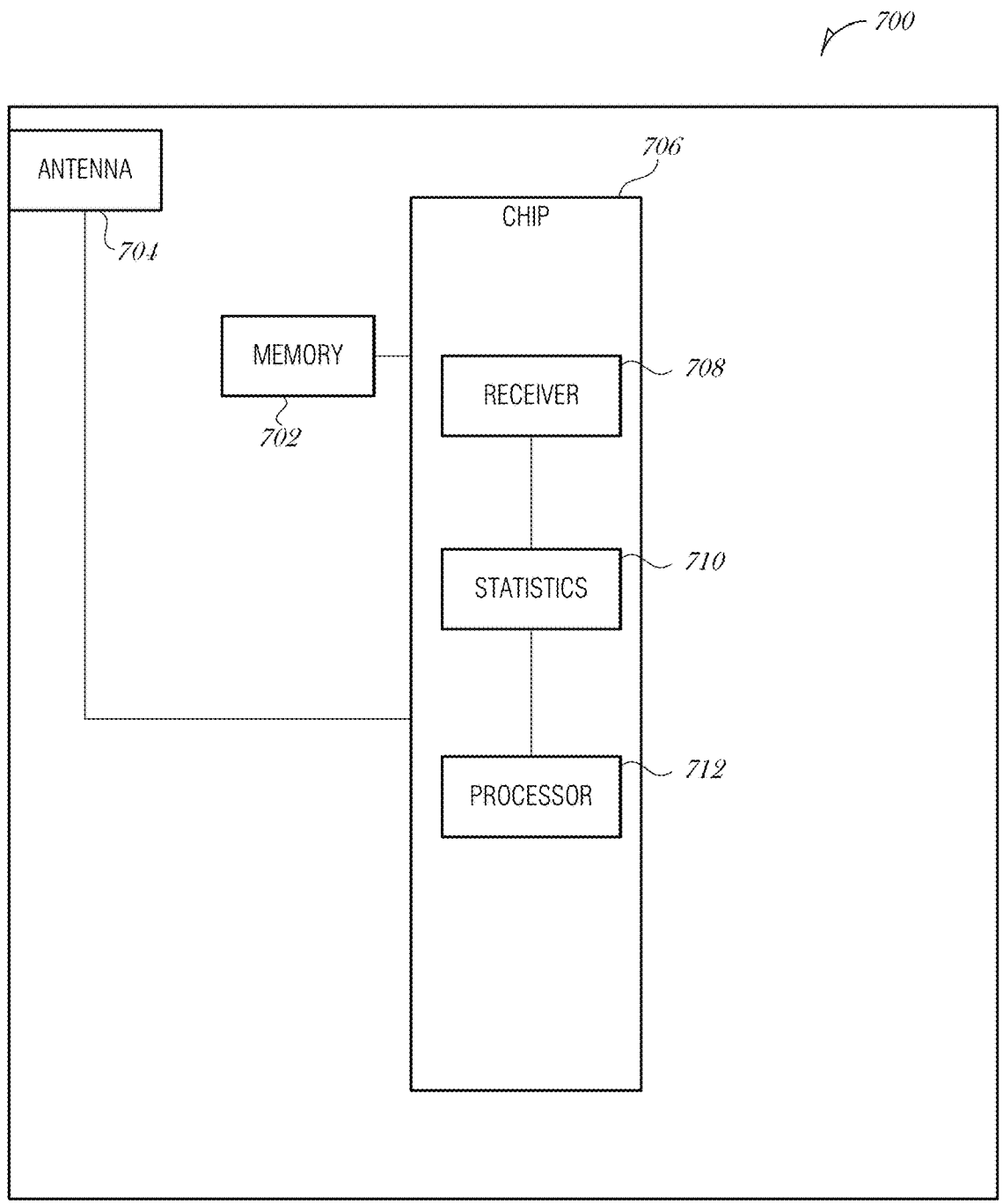
FIG. 7 is a block diagram illustrating a system for implementing random access channel management, according to an embodiment.

FIG. 7 is a block diagram illustrating a system 700 for implementing random access channel management, according to an embodiment. The system 700 may represent a base station or be one or more components of a base station.

The system 700 includes various components, some or all of which may be on the same printed circuit board or substrate. Components include, but are not limited to, memory device 702, an antenna 704, which are coupled to a chip 706.

Memory device 702 may be volatile memory (e.g., dynamic random access memory—DRAM) or non-volatile memory, such as flash memory (e.g., electrically-erasable read-only memory—EEPROM, NAND Flash, NOR Flash, etc.). Memory 702 may be used to store instructions to perform the various operations described herein. Memory 702 may also be used to store signal data, UE identification data, RACH preambles, control data, or other data.

The chip 706 may include one or more microprocessors, digital signal processors, etc. Chip 706 may contain one or more processing cores, each of which has one or more arithmetic logic units (ALU), instruction fetch units, instruction decode units, control units, registers, data stack pointers, program counters, and other essential components according to the particular architecture of the processor. As an illustrative example, chip 706 may be a system on chip (SOC) that includes multiple intellectual property (IP) blocks or IP cores. Chip 706 may include an x86-type of processor, which may be implemented as one of the IP blocks.

The system 700 is understood to encompass tangible entities that are physically constructed, specifically configured (e.g., hardwired), or temporarily (e.g., transitorily) configured (e.g., programmed) to operate in a specified manner or to perform part or all of any operations described herein. Such tangible entitles may be constructed using one or more circuits, such as with dedicated hardware (e.g., field programmable gate arrays (FPGAs), logic gates, graphics processing unit (GPU), a digital signal processor (DSP), etc.). As such, the tangible entities described herein may be referred to as circuits, circuitry, processor units, subsystems, or the like.

As discussed, the chip 706 may have several intellectual property (IP) blocks. IP blocks may be independent processing circuitry or reusable logic for a designated purpose. The chip 706 is able to selectively provide power to an IP block depending configuration data, state data, or other control signals.

IP blocks included on the chip 706 may include a receiver IP block 708, statistics IP block 710, and processor IP block 712. It is understood that the IP blocks may be implemented in one or more separate chips. Further, it is understood that IP blocks may be referred to as circuitry, circuits, processing circuitry, or processing circuits. IP blocks may include their own memory, instructions, processors, comparators, adders, subtractors, transistors, and other digital circuit components to provide general processing support or specific application tasks, depending on the design of the IP block.

Receiver IP block 708 may be implemented in hardware using dedicated logic or hardware, such as an ASIC. Receiver IP block 708 may be implemented in programmable hardware, such as an FPGA. Other hardwired hardware or configurable hardware may be used to implement the receiver IP block 708 including but not limited to a GPU, a CPU, a system on chip (SoC), or the like. Receiver IP block 708 interfaces with the antenna 704 and is used to receive at the base station, a signal from a user equipment (UE) transmitter to access resources of the base station. In an embodiment, the signal is a part of a RACH preamble transmission.

Statistics IP block 710 may be implemented in hardware using dedicated logic or hardware, such as an ASIC. Statistics IP block 710 may be implemented in programmable hardware, such as an FPGA. Other hardwired hardware or configurable hardware may be used to implement the statistics IP block 710 including but not limited to a GPU, a CPU, a system on chip (SoC), or the like. Statistics IP block 710 is used to calculate high-order statistics on the signal to produce an identification indication. In an embodiment, to calculate the high-order statistics on the signal, the statistics IP block 710 is to calculate a fourth-order moment of noise of the signal. In another embodiment, to calculate the high-order statistics on the signal, the statistics IP block 710 is to calculate a frequency offset of the signal. In another embodiment, to calculate the high-order statistics on the signal, the statistics IP block 710 is to calculate an amplitude offset of the signal. In another embodiment, the signature may be composed of multiple high-order statistics. As such, to calculate the high-order statistics on the signal, the statistics IP block 710 is to calculate two of: a fourth-order moment of noise of the signal, a frequency offset of the signal, or an amplitude offset of the signal.

Processor IP block 712 interfaces with the memory device to obtain identification indication and associate the identification indication with the UE transmitter. Processor IP block 712 may include one or more processing cores, each of which has one or more arithmetic logic units (ALU), instruction fetch units, instruction decode units, control units, registers, data stack pointers, program counters, and other essential components according to the particular architecture of the processor. For instance, the UE transmitter may be given an arbitrary numeric or alphanumeric label and associated with the high-order statistics or a derivative thereof. The processor IP block 712 then uses the identification indication to determine that multiple failures of random access channel (RACH) processes have occurred from the UE transmitter. If so, the processor IP block 712 restricts later attempts to connect to the base station from the UE transmitter.

In an embodiment, the system 700 is an eNodeB. In another embodiment, the system 700 is an gNodeB.

In an embodiment, to restrict later attempts to connect to the base station, the processor IP block 712 is to update a denylist to include the identification indication. The denylist (also referred to as a blocklist or blacklist), may be stored in the memory device 702.

In an embodiment, the processor IP block 712 is to determine whether the identification indication is on a denylist. In a related embodiment, in response to determining that the identification indication is on the denylist, the processor IP block 712 is to restrict the UE transmitter access to the resources of the base station.

Figure 8:
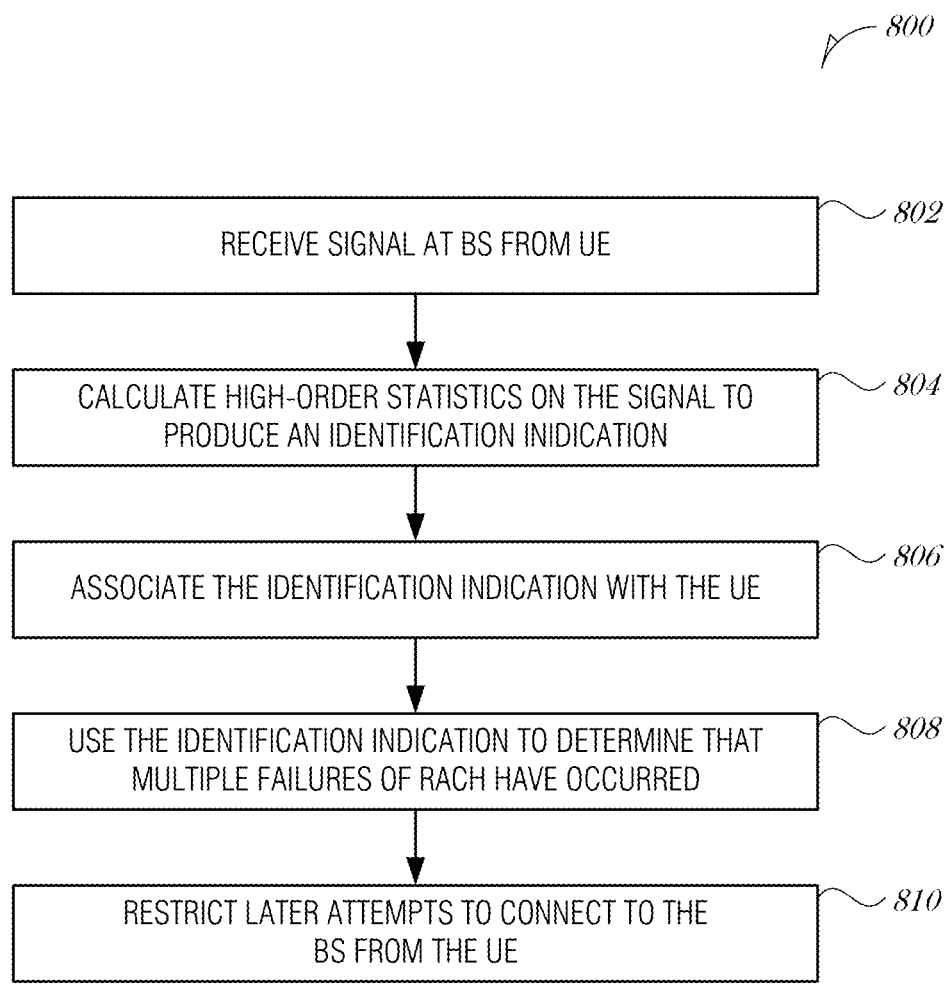
FIG. 8 is a flowchart illustrating a method for implementing random access channel management, according to an embodiment.

FIG. 8 is a flowchart illustrating a method 800 for implementing random access channel management, according to an embodiment. The method 800 may be performed by a base station (e.g., NodeB, eNodeB, gNodeB), or another device, such as system 700, or another system, such as an Edge computing node 450.

At 802, a signal from a user equipment (UE) transmitter to access resources of the base station is received at a base station. In an embodiment, the base station is an eNodeB. In another embodiment, the base station is an gNodeB. In an embodiment, the signal is a part of a RACH preamble transmission.

At 804, high-order statistics on the signal to are calculated produce an identification indication. In an embodiment, calculating the high-order statistics on the signal includes calculating a fourth-order moment of noise of the signal. In another embodiment, calculating the high-order statistics on the signal includes calculating a frequency offset of the signal. In another embodiment, calculating the high-order statistics on the signal includes calculating an amplitude offset of the signal. In another embodiment, calculating the high-order statistics on the signal includes calculating two of: a fourth-order moment of noise of the signal, a frequency offset of the signal, or an amplitude offset of the signal.

At 806, the identification indication is associated with the UE transmitter.

At 810, the identification indication is used to determine that multiple failures of random access channel (RACH) processes have occurred from the UE transmitter.

At 812, later attempts to connect to the base station from the UE transmitter are restricted. In an embodiment, restricting later attempts to connect to the base station comprises updating a denylist to include the identification indication.

In a further embodiment, the method 800 includes determining whether the identification indication is on a denylist. In a further embodiment, in response to determining that the identification indication is on the denylist, the method 800 includes restricting the UE transmitter access to the resources of the base station.

Figure 9:
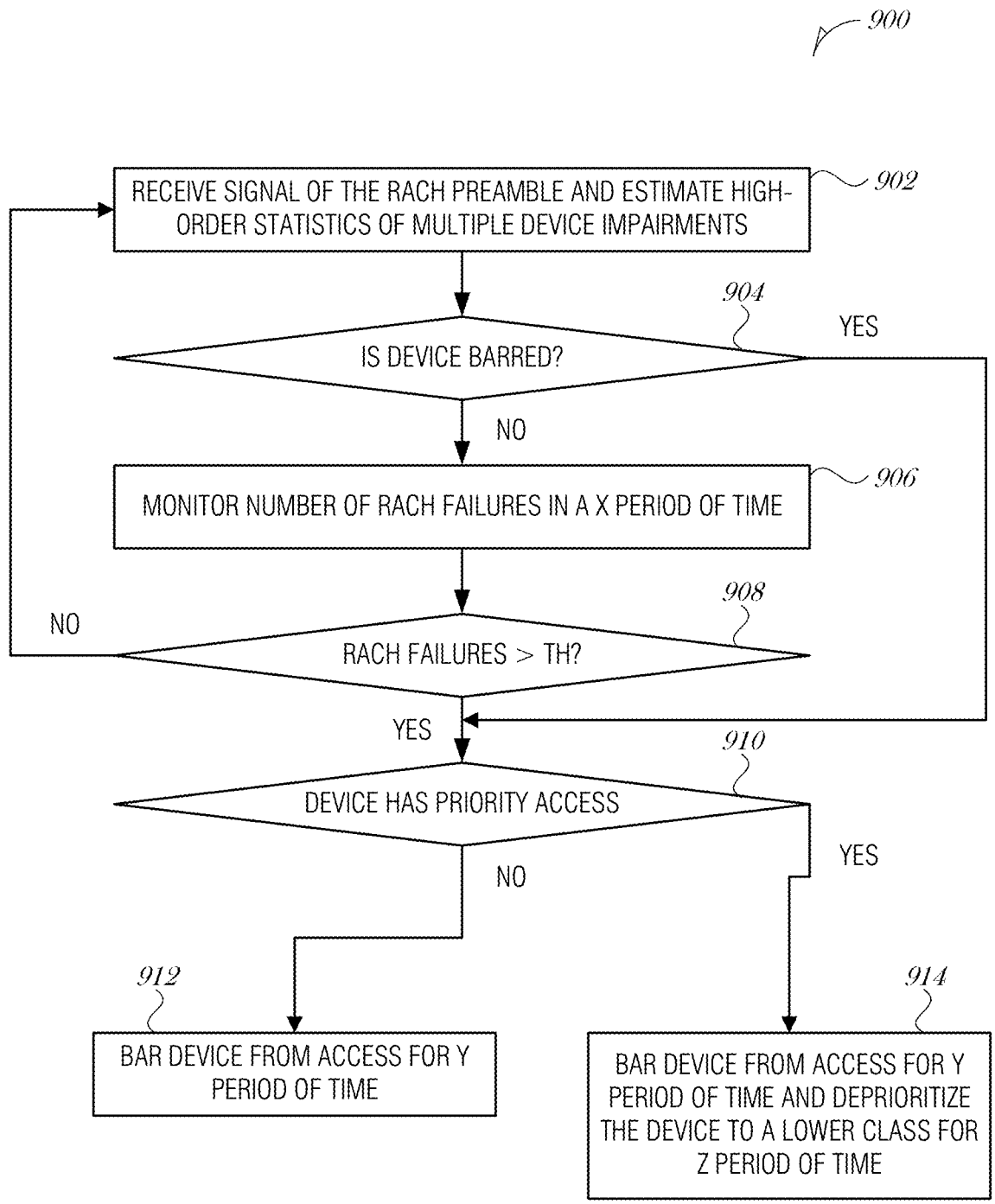
FIG. 9 is a flowchart illustrating a method for implementing random access channel management, according to an embodiment.

FIG. 9 is a flowchart illustrating a method 900 for implementing random access channel management, according to an embodiment. The method 900 may be performed by a base station (e.g., NodeB, eNodeB, gNodeB), or another device, such as system 700, or another system, such as an Edge computing node 450.

At 902, a RACH preamble is received, and high-order statistics are calculated to produce a device signature. At 904, it is determined whether the device is barred from the RACH process. If so, then the method 900 proceeds to decision block 910. If not, the method 900 proceeds to block 906, where the base station monitors the number of RACH failures in a period of time from this device. If the RACH failure does not exceed a threshold amount (decision block 908), then the RACH failure is considered non-hostile and the method 900 returns to block 902 to receive another RACH preamble. If the number of RACH failures exceeds a threshold amount (decision block 908), then the device will be blocked (barred). If the device has priority access (decision block 910), then the device is barred for Y period of time (where Y may be infinity), and the device is deprioritized to a lower class for Z period of time. The time periods Y and Z may be the same value or have different values. If the device does not have priority access, then it is barred for Y period of time (operation block 912).

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, such as modules, intellectual property (IP) blocks or cores, or mechanisms. Such logic or components may be hardware, software, or firmware communicatively coupled to one or more processors in order to carry out the operations described herein. Logic or components may be hardware modules (e.g., IP block), and as such may be considered tangible entities capable of performing specified operations and may be configured or arranged in a certain manner. In an example, circuits may be arranged (e.g., internally or with respect to external entities such as other circuits) in a specified manner as an IP block, IP core, system-on-chip (SoC), or the like.

In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein.

Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

An IP block (also referred to as an IP core) is a reusable unit of logic, cell, or integrated circuit. An IP block may be used as a part of a field programmable gate array (FPGA), application-specific integrated circuit (ASIC), programmable logic device (PLD), system on a chip (SoC), or the like. It may be configured for a particular purpose, such as digital signal processing or image processing. Example IP cores include central processing unit (CPU) cores, integrated graphics, security, input/output (I/O) control, system agent, graphics processing unit (GPU), artificial intelligence, neural processors, image processing unit, communication interfaces, memory controller, peripheral device control, platform controller hub, or the like.

Additional Notes & Examples

Example 1 is an apparatus for a base station, comprising: receiver circuitry to receive at the base station, a signal from a user equipment (UE) transmitter to access resources of the base station; statistics circuitry to calculate high-order statistics on the signal to produce an identification indication; a memory device to store the high-order statistics and the identification indication; and processing circuitry to: associate the identification indication with the UE transmitter; use the identification indication to determine that multiple failures of a random access channel (RACH) process have occurred from the UE transmitter; and restrict later attempts by the UE transmitter to perform RACH processes with the base station.

In Example 2, the subject matter of Example 1 includes, wherein the base station is an eNodeB.

In Example 3, the subject matter of Examples 1-2 includes, wherein the base station is an gNodeB.

In Example 4, the subject matter of Examples 1-3 includes, wherein the signal is a part of a RACH preamble transmission.

In Example 5, the subject matter of Examples 1-4 includes, wherein to calculate the high-order statistics on the signal, the statistics circuitry is to calculate a fourth-order moment of noise of the signal.

In Example 6, the subject matter of Examples 1-5 includes, wherein to calculate the high-order statistics on the signal, the statistics circuitry is to calculate a frequency offset of the signal.

In Example 7, the subject matter of Examples 1-6 includes, wherein to calculate the high-order statistics on the signal, the statistics circuitry is to calculate an amplitude offset of the signal.

In Example 8, the subject matter of Examples 1-7 includes, wherein to calculate the high-order statistics on the signal, the statistics circuitry is to calculate two of: a fourth-order moment of noise of the signal, a frequency offset of the signal, or an amplitude offset of the signal.

In Example 9, the subject matter of Examples 1-8 includes, wherein to restrict later attempts to connect to the base station, the processing circuitry is to update a denylist to include the identification indication.

In Example 10, the subject matter of Examples 1-9 includes, wherein the processing circuity is to determine whether the identification indication is on a denylist.

In Example 11, the subject matter of Example 10 includes, wherein in response to determining that the identification indication is on the denylist, wherein the processing circuity is to restrict the UE transmitter access to the resources of the base station.

Example 12 is at least one machine-readable medium including instructions, which when executed by a machine, cause the machine to perform operations comprising: receiving at a base station, a signal from a user equipment (UE) transmitter to access resources of the base station; calculating high-order statistics on the signal to produce an identification indication; associating the identification indication with the UE transmitter; using the identification indication to determine that multiple failures of a random access channel (RACH) process have occurred from the UE transmitter; and restricting later attempts by the UE transmitter to perform RACH processes with the base station.

In Example 13, the subject matter of Example 12 includes, wherein the base station is an eNodeB.

In Example 14, the subject matter of Examples 12-13 includes, wherein the base station is an gNodeB.

In Example 15, the subject matter of Examples 12-14 includes, wherein the signal is a part of a RACH preamble transmission.

In Example 16, the subject matter of Examples 12-15 includes, wherein calculating the high-order statistics on the signal comprises calculating a fourth-order moment of noise of the signal.

In Example 17, the subject matter of Examples 12-16 includes, wherein calculating the high-order statistics on the signal comprises calculating a frequency offset of the signal.

In Example 18, the subject matter of Examples 12-17 includes, wherein calculating the high-order statistics on the signal comprises calculating an amplitude offset of the signal.

In Example 19, the subject matter of Examples 12-18 includes, wherein calculating the high-order statistics on the signal comprises calculating two of: a fourth-order moment of noise of the signal, a frequency offset of the signal, or an amplitude offset of the signal.

In Example 20, the subject matter of Examples 12-19 includes, wherein restricting later attempts to connect to the base station comprises updating a denylist to include the identification indication.

In Example 21, the subject matter of Examples 12-20 includes, determining whether the identification indication is on a denylist.

In Example 22, the subject matter of Example 21 includes, in response to determining that the identification indication is on the denylist, restricting the UE transmitter access to the resources of the base station.

Example 23 is a method, comprising: receiving at a base station, a signal from a user equipment (UE) transmitter to access resources of the base station; calculating high-order statistics on the signal to produce an identification indication; associating the identification indication with the UE transmitter; using the identification indication to determine that multiple failures of a random access channel (RACH) process have occurred from the UE transmitter; and restricting later attempts by the UE transmitter to perform RACH processes with the base station.

In Example 24, the subject matter of Example 23 includes, wherein the base station is an eNodeB.

In Example 25, the subject matter of Examples 23-24 includes, wherein the base station is an gNodeB.

In Example 26, the subject matter of Examples 23-25 includes, wherein the signal is a part of a RACH preamble transmission.

In Example 27, the subject matter of Examples 23-26 includes, wherein calculating the high-order statistics on the signal comprises calculating a fourth-order moment of noise of the signal.

In Example 28, the subject matter of Examples 23-27 includes, wherein calculating the high-order statistics on the signal comprises calculating a frequency offset of the signal.

In Example 29, the subject matter of Examples 23-28 includes, wherein calculating the high-order statistics on the signal comprises calculating an amplitude offset of the signal.

In Example 30, the subject matter of Examples 23-29 includes, wherein calculating the high-order statistics on the signal comprises calculating two of: a fourth-order moment of noise of the signal, a frequency offset of the signal, or an amplitude offset of the signal.

In Example 31, the subject matter of Examples 23-30 includes, wherein restricting later attempts to connect to the base station comprises updating a denylist to include the identification indication.

In Example 32, the subject matter of Examples 23-31 includes, determining whether the identification indication is on a denylist.

In Example 33, the subject matter of Example 32 includes, in response to determining that the identification indication is on the denylist, restricting the UE transmitter access to the resources of the base station.

Example 34 is at least one machine-readable medium including instructions, which when executed by a machine, cause the machine to perform operations of any of the methods of Examples 23-33.

Example 35 is an apparatus comprising means for performing any of the methods of Examples 23-33.

Example 36 is an apparatus, comprising: means for receiving at a base station, a signal from a user equipment (UE) transmitter to access resources of the base station; means for calculating high-order statistics on the signal to produce an identification indication; means for associating the identification indication with the UE transmitter; means for using the identification indication to determine that multiple failures of a random access channel (RACH) process have occurred from the UE transmitter; and means for restricting later attempts by the UE transmitter to perform RACH processes with the base station.

In Example 37, the subject matter of Example 36 includes, wherein the base station is an eNodeB.

In Example 38, the subject matter of Examples 36-37 includes, wherein the base station is an gNodeB.

In Example 39, the subject matter of Examples 36-38 includes, wherein the signal is a part of a RACH preamble transmission.

In Example 40, the subject matter of Examples 36-39 includes, wherein the means for calculating the high-order statistics on the signal comprise means for calculating a fourth-order moment of noise of the signal.

In Example 41, the subject matter of Examples 36-40 includes, wherein the means for calculating the high-order statistics on the signal comprise means for calculating a frequency offset of the signal.

In Example 42, the subject matter of Examples 36-41 includes, wherein the means for calculating the high-order statistics on the signal comprise means for calculating an amplitude offset of the signal.

In Example 43, the subject matter of Examples 36-42 includes, wherein the means for calculating the high-order statistics on the signal comprise means for calculating two of: a fourth-order moment of noise of the signal, a frequency offset of the signal, or an amplitude offset of the signal.

In Example 44, the subject matter of Examples 36-43 includes, wherein the means for restricting later attempts to connect to the base station comprise means for updating a denylist to include the identification indication.

In Example 45, the subject matter of Examples 36-44 includes, means for determining whether the identification indication is on a denylist.

In Example 46, the subject matter of Example 45 includes, means for in response to determining that the identification indication is on the denylist, restricting the UE transmitter access to the resources of the base station.

Example 47 is at least one machine-readable medium including instructions that, when executed by processing circuitry, cause the processing circuitry to perform operations to implement of any of Examples 1-46.

Example 48 is an apparatus comprising means to implement of any of Examples 1-46.

Example 49 is a system to implement of any of Examples 1-46.

Example 50 is a method to implement of any of Examples 1-46.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An apparatus for a base station, comprising:
receiver circuitry to receive at the base station, a signal from a user equipment (UE) transmitter to access resources of the base station;
statistics circuitry to calculate higher-order statistics on the signal to produce an identification indication, wherein to calculate the higher-order statistics, the statistics circuitry is to use estimates of the higher-order statistics of impairment of the signal;
a memory device to store the higher-order statistics and the identification indication; and
processing circuitry to:
associate the identification indication with the UE transmitter;
use the identification indication to determine that multiple failures of a random access channel (RACH) process have occurred from the UE transmitter; and
restrict later attempts by the UE transmitter to perform RACH processes with the base station.

2. The apparatus of claim 1, wherein the base station is an eNodeB.

3. The apparatus of claim 1, wherein the base station is an gNodeB.

4. The apparatus of claim 1, wherein the signal is a part of a RACH preamble transmission.

5. The apparatus of claim 1, wherein to calculate the higher-order statistics on the signal, the statistics circuitry is to calculate a fourth-order moment of noise of the signal.

6. The apparatus of claim 1, wherein to calculate the higher-order statistics on the signal, the statistics circuitry is to calculate a frequency offset of the signal.

7. The apparatus of claim 1, wherein to calculate the higher-order statistics on the signal, the statistics circuitry is to calculate an amplitude offset of the signal.

8. The apparatus of claim 1, wherein to calculate the higher-order statistics on the signal, the statistics circuitry is to calculate two of: a fourth-order moment of noise of the signal, a frequency offset of the signal, or an amplitude offset of the signal.

9. The apparatus of claim 1, wherein to restrict later attempts to connect to the base station, the processing circuitry is to update a denylist to include the identification indication.

10. The apparatus of claim 1, wherein the processing circuity is to determine whether the identification indication is on a denylist.

11. The apparatus of claim 10, wherein in response to determining that the identification indication is on the denylist, wherein the processing circuity is to restrict the UE transmitter access to the resources of the base station.

12. At least one non-transitory machine-readable medium including instructions, which when executed by a machine, cause the machine to perform operations comprising:
receiving at a base station, a signal from a user equipment (UE) transmitter to access resources of the base station;
calculating higher-order statistics on the signal to produce an identification indication, wherein calculating the higher-order statistics includes using estimates of the higher-order statistics of impairment of the signal;
associating the identification indication with the UE transmitter;
using the identification indication to determine that multiple failures of a random access channel (RACH) process have occurred from the UE transmitter; and
restricting later attempts by the UE transmitter to perform RACH processes with the base station.

13. The at least one machine-readable medium of claim 12, wherein the base station is an eNodeB.

14. The at least one machine-readable medium of claim 12, wherein the base station is an gNodeB.

15. The at least one machine-readable medium of claim 12, wherein the signal is a part of a RACH preamble transmission.

16. The at least one machine-readable medium of claim 12, wherein calculating the higher-order statistics on the signal comprises calculating a fourth-order moment of noise of the signal.

17. The at least one machine-readable medium of claim 12, wherein calculating the higher-order statistics on the signal comprises calculating a frequency offset of the signal.

18. The at least one machine-readable medium of claim 12, wherein calculating the higher-order statistics on the signal comprises calculating an amplitude offset of the signal.

19. The at least one machine-readable medium of claim 12, wherein calculating the higher-order statistics on the signal comprises calculating two of: a fourth-order moment of noise of the signal, a frequency offset of the signal, or an amplitude offset of the signal.

20. The at least one machine-readable medium of claim 12, wherein restricting later attempts to connect to the base station comprises updating a denylist to include the identification indication.

21. The at least one machine-readable medium of claim 12, further comprising determining whether the identification indication is on a denylist.

22. The at least one machine-readable medium of claim 21, further comprising in response to determining that the identification indication is on the denylist, restricting the UE transmitter access to the resources of the base station.

23. A method, comprising:
receiving at a base station, a signal from a user equipment (UE) transmitter to access resources of the base station;
calculating, at the base station, higher-order statistics on the signal to produce an identification indication, wherein calculating the higher-order statistics includes using estimates of the higher-order statistics of impairment of the signal;
associating, at the base station, the identification indication with the UE transmitter;
using, at the base station, the identification indication to determine that multiple failures of a random access channel (RACH) process have occurred from the UE transmitter; and
restricting, at the base station, later attempts by the UE transmitter to perform RACH processes with the base station.

24. The method of claim 23, wherein calculating the higher-order statistics on the signal comprises calculating a fourth-order moment of noise of the signal.

25. The method of claim 23, wherein calculating the higher-order statistics on the signal comprises calculating a frequency offset of the signal.

* * * * *